(12) United States Patent
Uchino et al.

(10) Patent No.: US 8,009,535 B2
(45) Date of Patent: Aug. 30, 2011

(54) RECORDING APPARATUS AND METHOD, COMPUTER PROGRAM, AND RECORDING MEDIUM

(75) Inventors: Hiroyuki Uchino, Tokorozawa (JP);
Shogo Miyanabe, Higashiyamato (JP);
Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/671,117

(22) PCT Filed: Aug. 1, 2007

(86) PCT No.: PCT/JP2007/065093
§ 371 (c)(1),
(2), (4) Date: May 26, 2010

(87) PCT Pub. No.: WO2009/016754
PCT Pub. Date: Feb. 5, 2009

(65) Prior Publication Data
US 2010/0290325 A1 Nov. 18, 2010

(51) Int. Cl.
*G11B 15/52* (2006.01)
(52) U.S. Cl. .................. 369/47.53; 369/53.27
(58) Field of Classification Search .......... None
See application file for complete search history.

(56) References Cited

U.S. PATENT DOCUMENTS

| 2003/0058765 | A1 | 3/2003 | Schreurs et al. | |
| 2007/0177487 | A1* | 8/2007 | Ikeda et al. | 369/116 |
| 2009/0303846 | A1* | 12/2009 | Ueki | 369/44.27 |

FOREIGN PATENT DOCUMENTS

| JP | 2000-207742 | 7/2000 |
| JP | 2001-331940 | 11/2001 |
| JP | 2005-505091 | 2/2005 |
| JP | 2005-196902 | 7/2005 |
| JP | 2005-293673 | 10/2005 |
| JP | 3765223 | 2/2006 |
| JP | 2006-099889 | 4/2006 |

OTHER PUBLICATIONS

International Search Report—PCT/JP2007/065093—Sep. 4, 2007.

* cited by examiner

*Primary Examiner* — Paul Huber
(74) *Attorney, Agent, or Firm* — Young & Thompson

(57) ABSTRACT

A recording apparatus includes: a first calculating device for calculating an optimum power for recording the data pattern into a recording-scheduled area (RSA) in an inner area; a first controlling device recording the data pattern with the optimum power outside an end on an outer side of the RSA; a second calculating device calculating an adjustment power used in adjusting a recording condition outside the end on the outer side of the RSA, considering a difference between recording sensitivity inside and outside the RSA; a second controlling device recording the data pattern for adjusting the recording condition with the adjustment power outside the RSA; a reading device obtaining a read signal; a measuring device measuring read signal jitter; an adjusting device adjusting the recording condition for satisfactory jitter; and a third controlling device to record the data pattern into the RSA using the optimum power and the adjusted recording condition.

14 Claims, 23 Drawing Sheets

[FIG. 1]
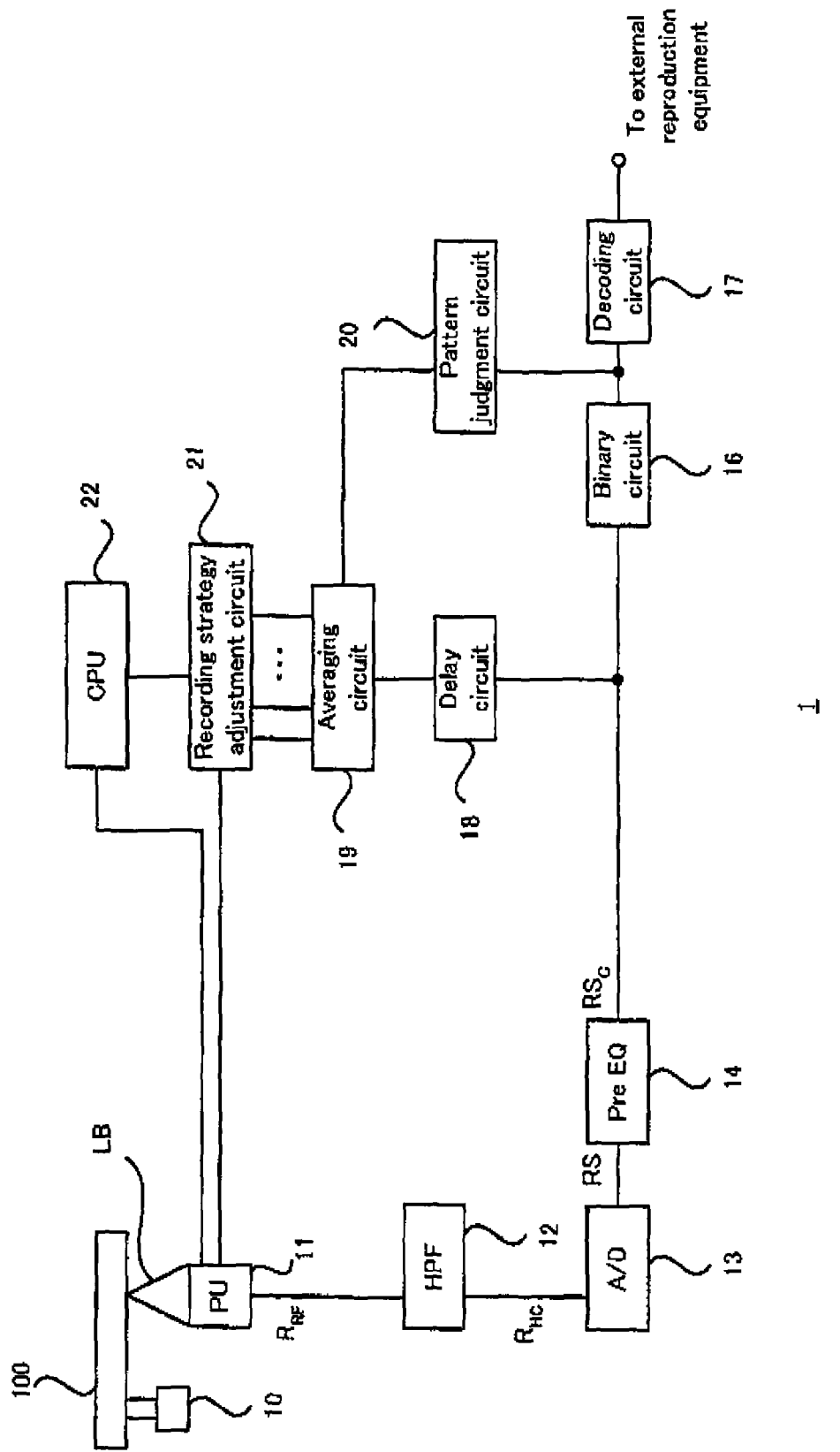

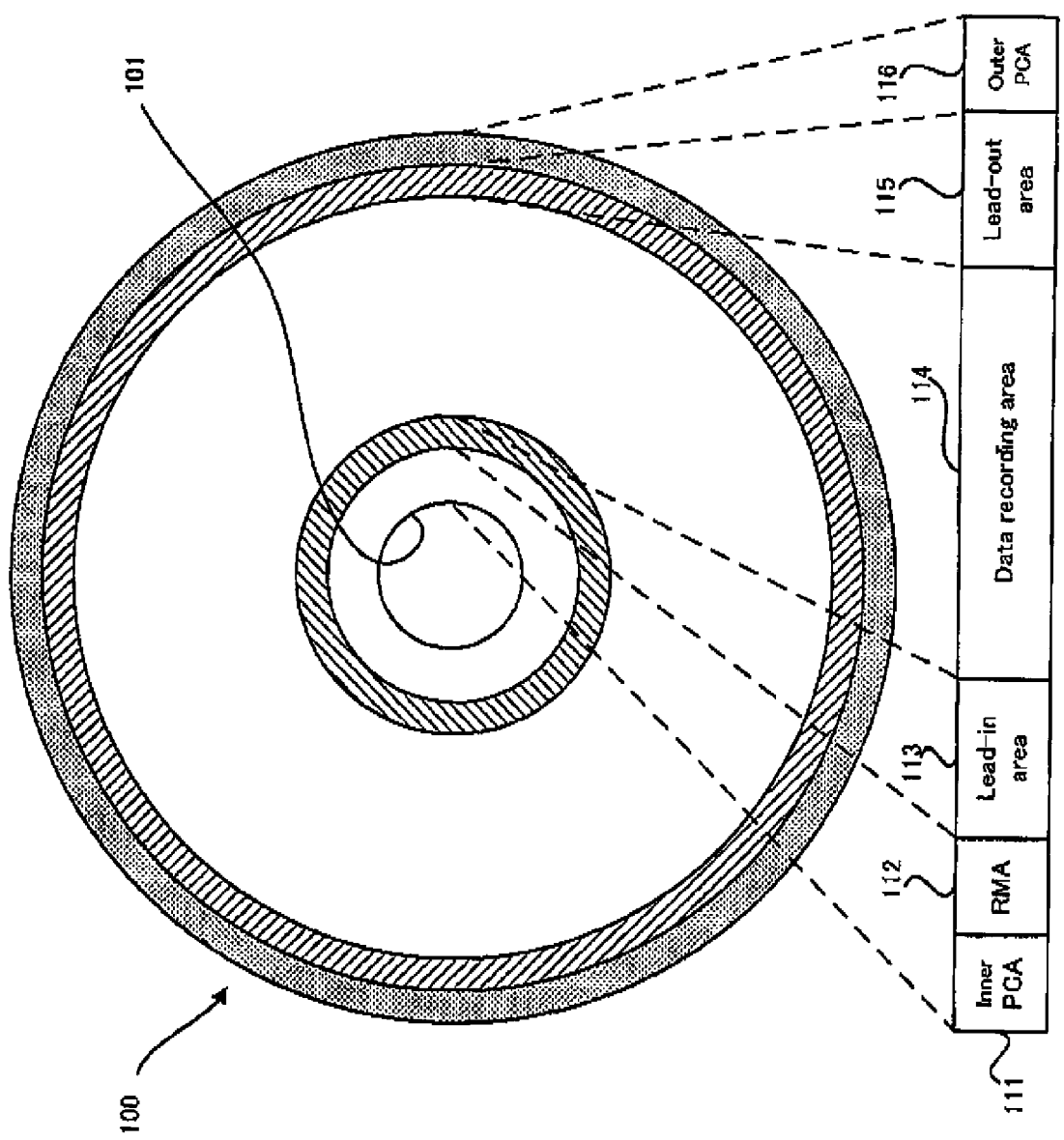
[FIG. 2]

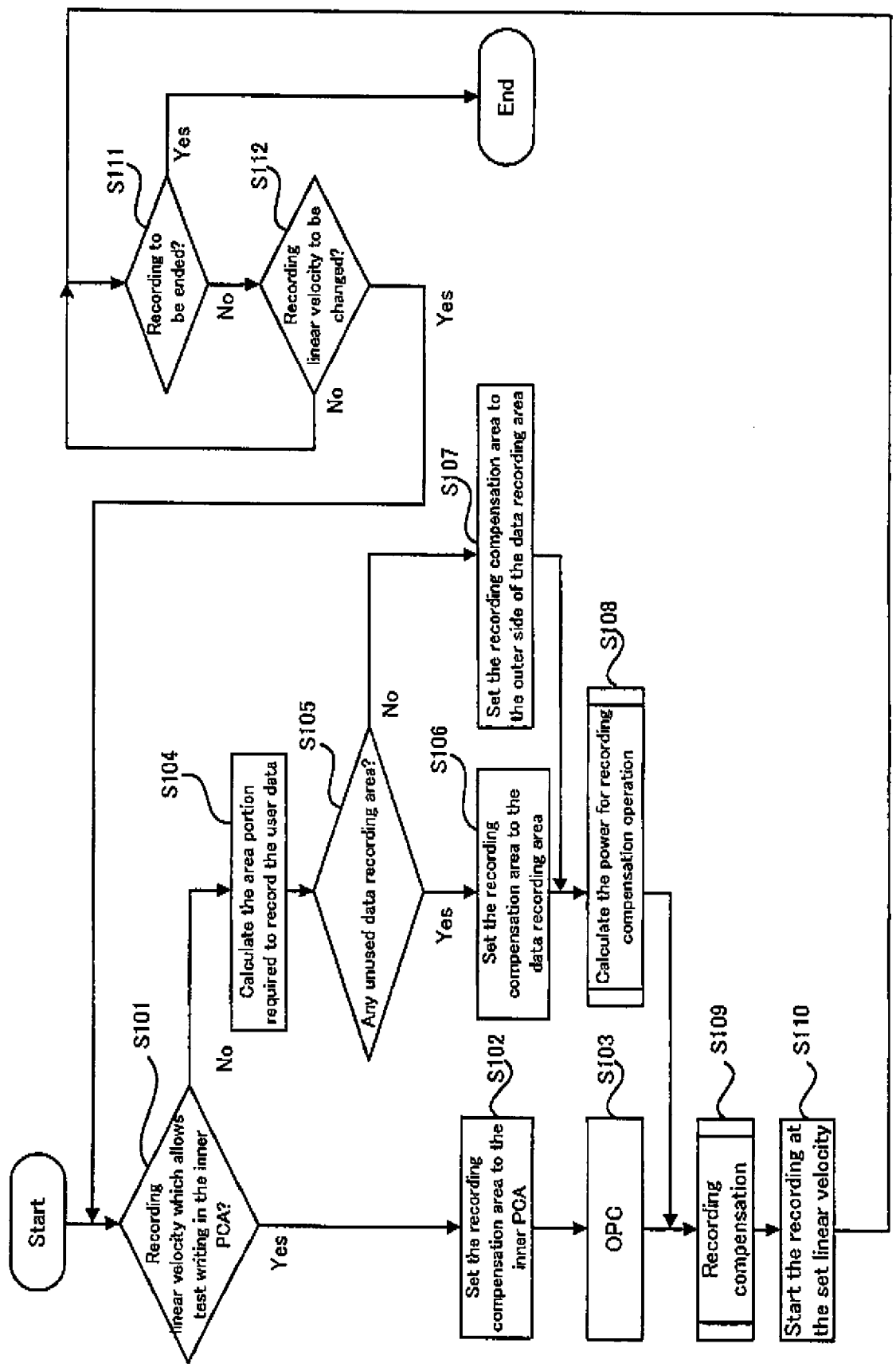
[FIG. 3]

[FIG. 4]
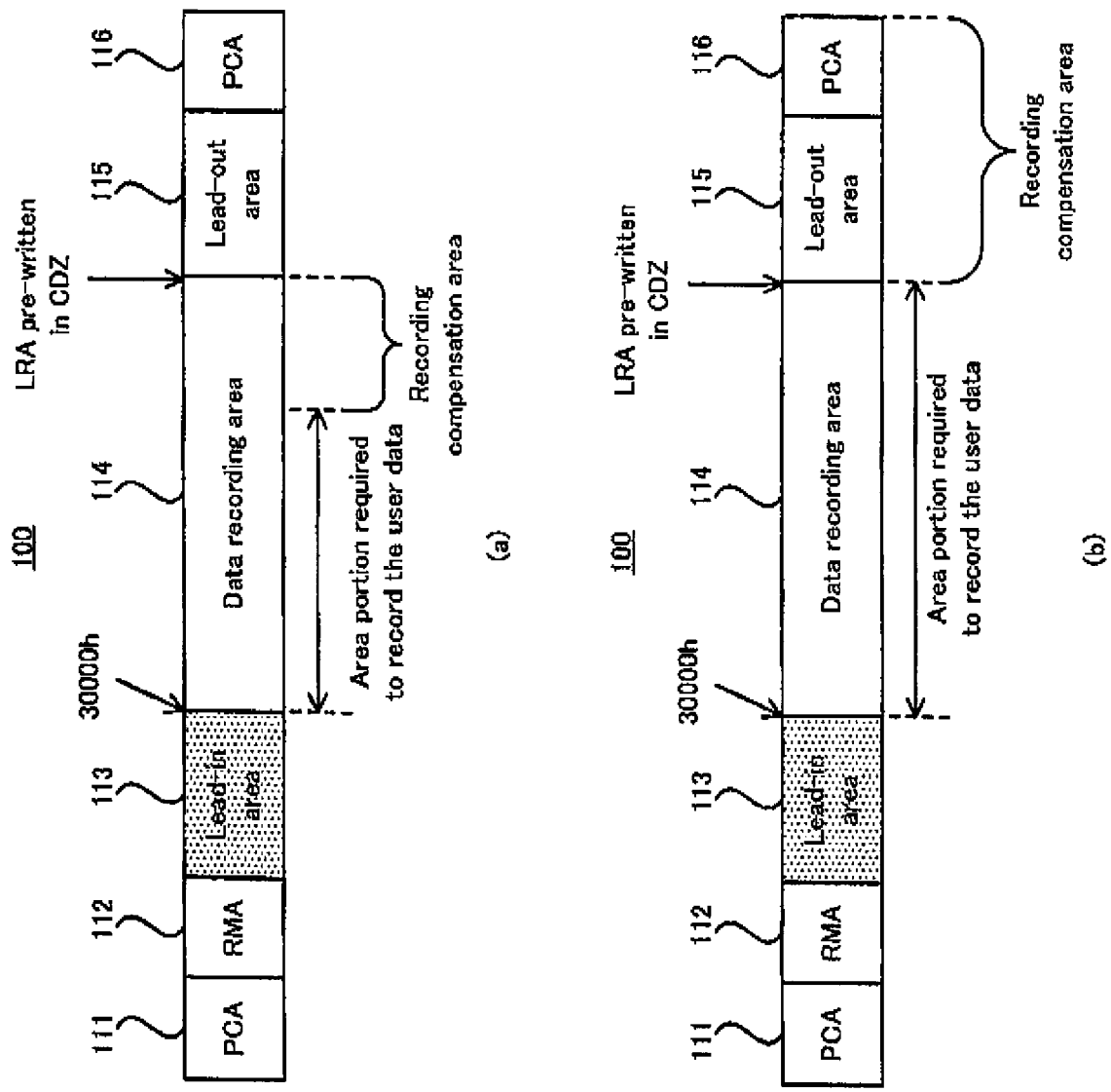

[FIG. 5]
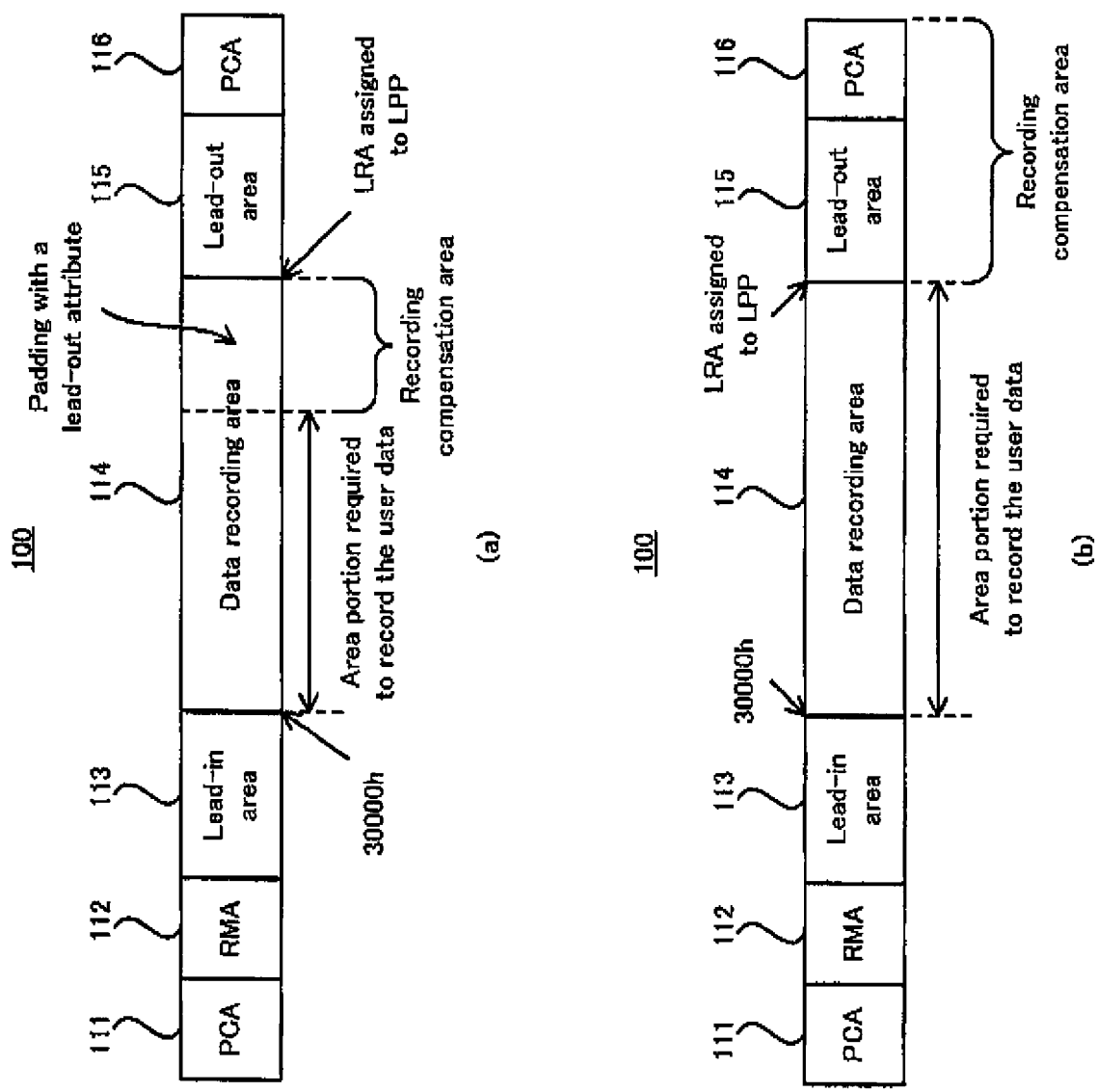

[FIG. 6]
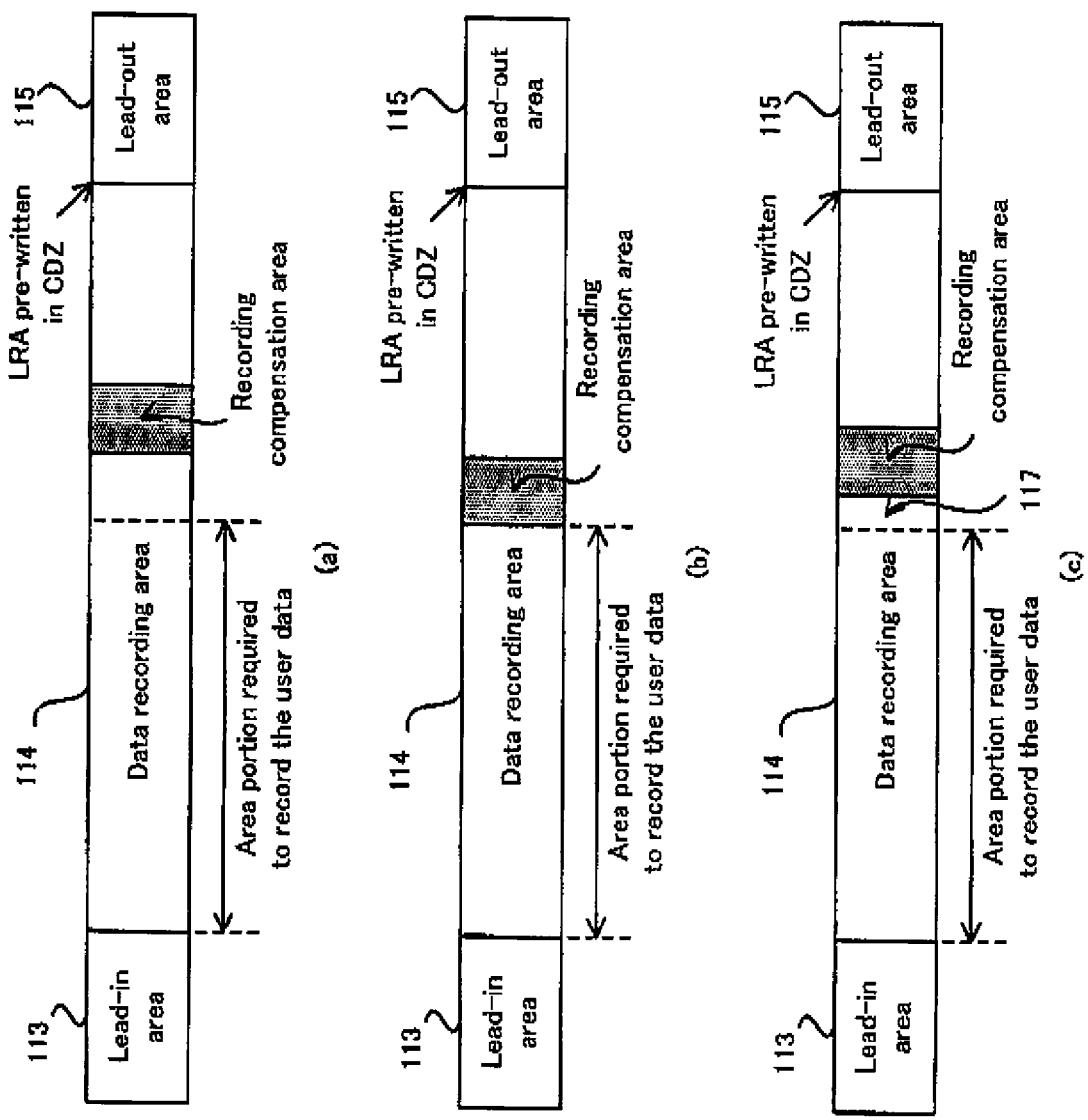

[FIG. 7]
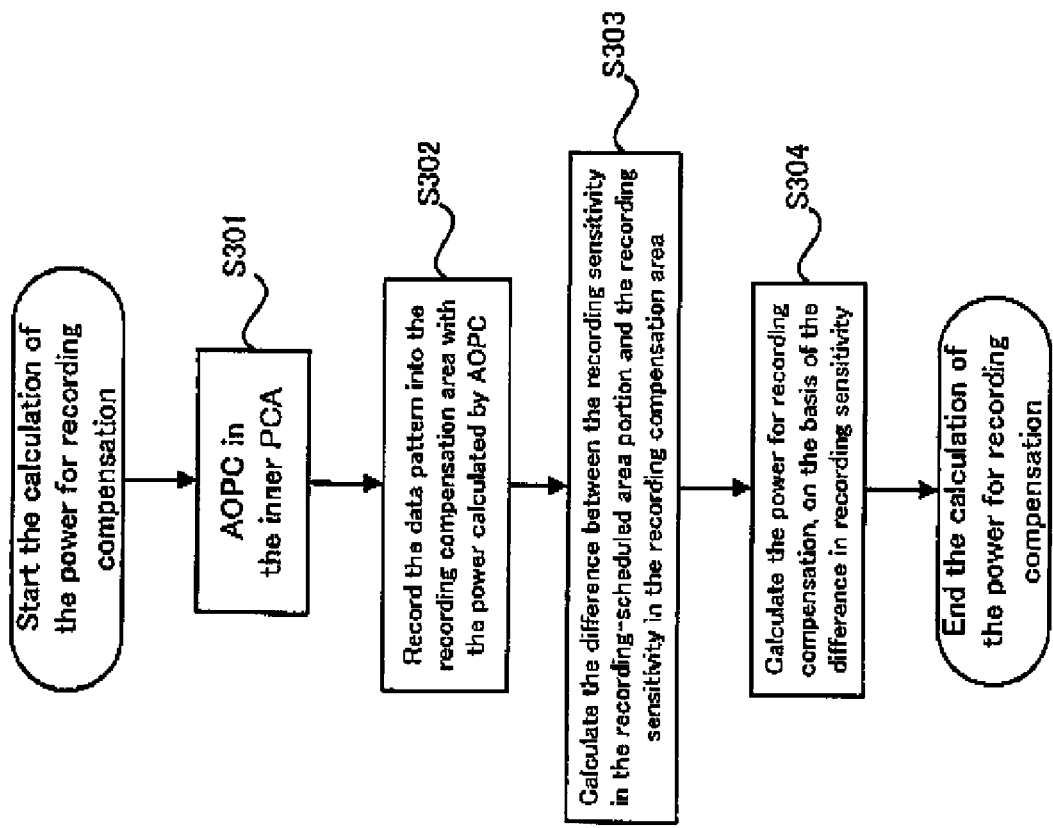

[FIG. 8]
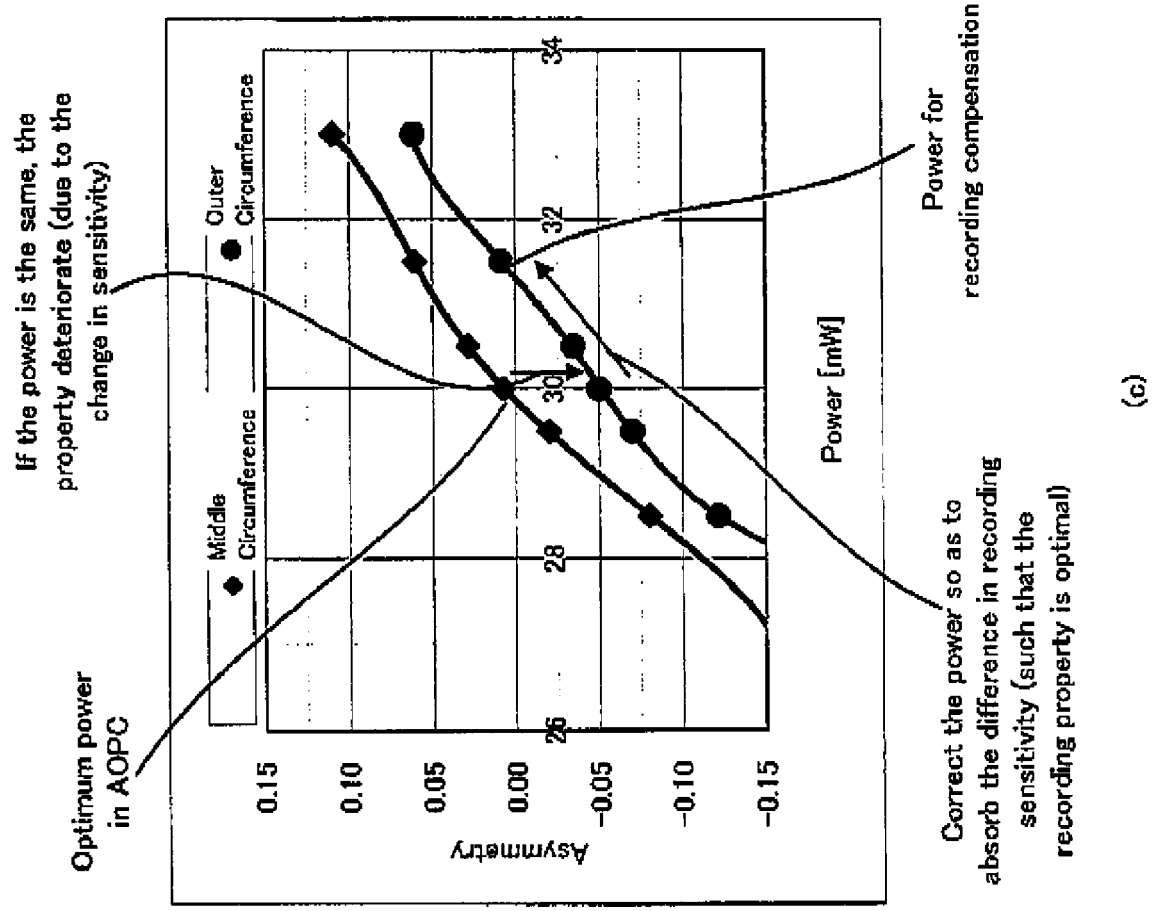
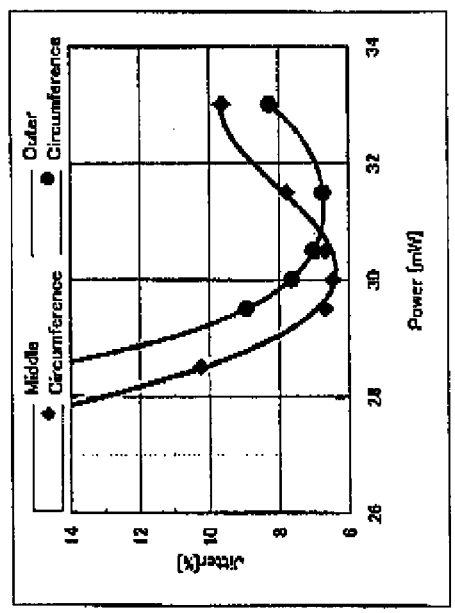
(a)
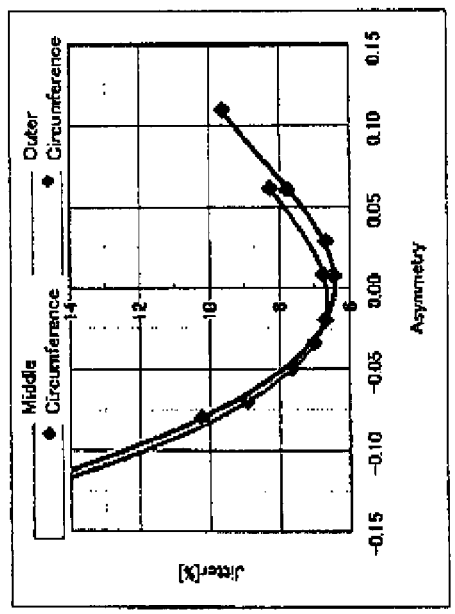
(b)

[FIG. 9]
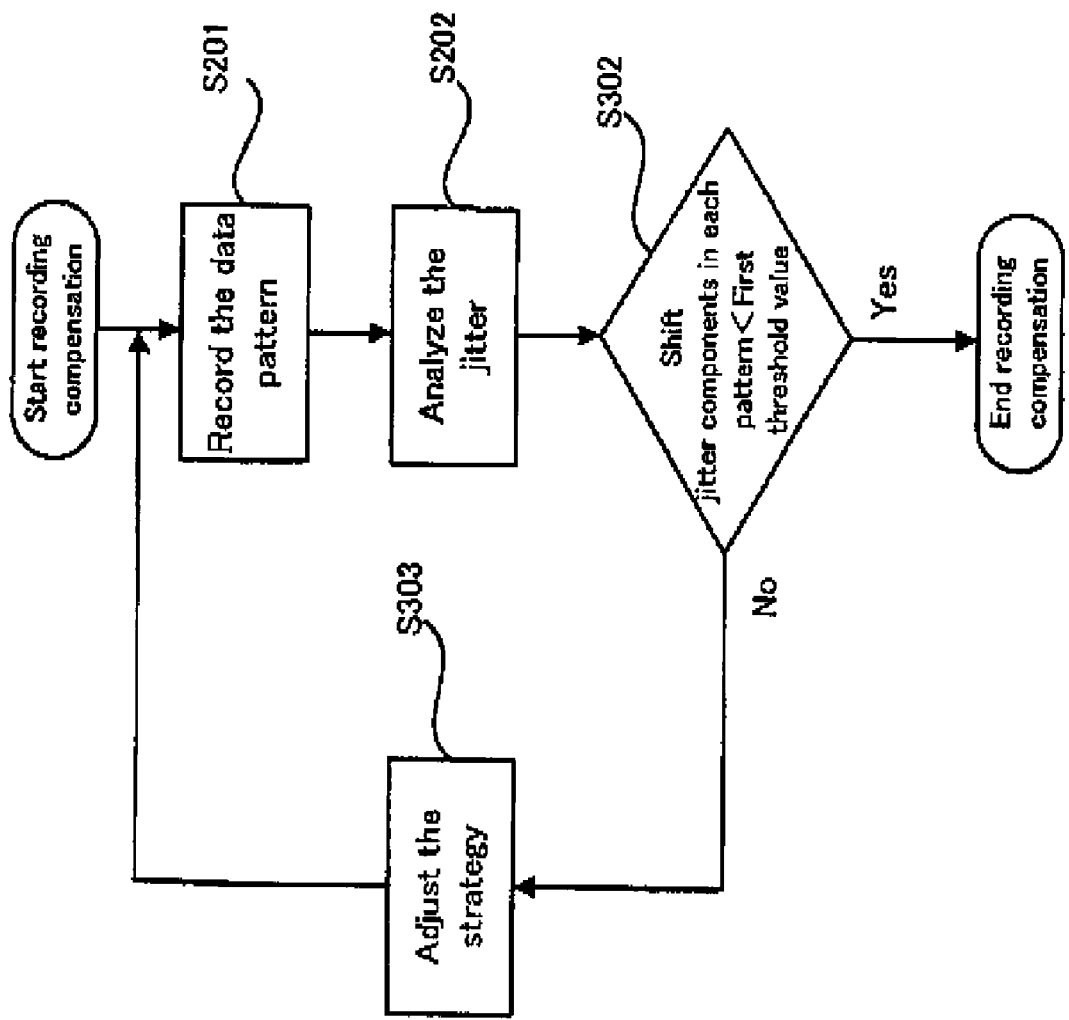

[FIG. 10]
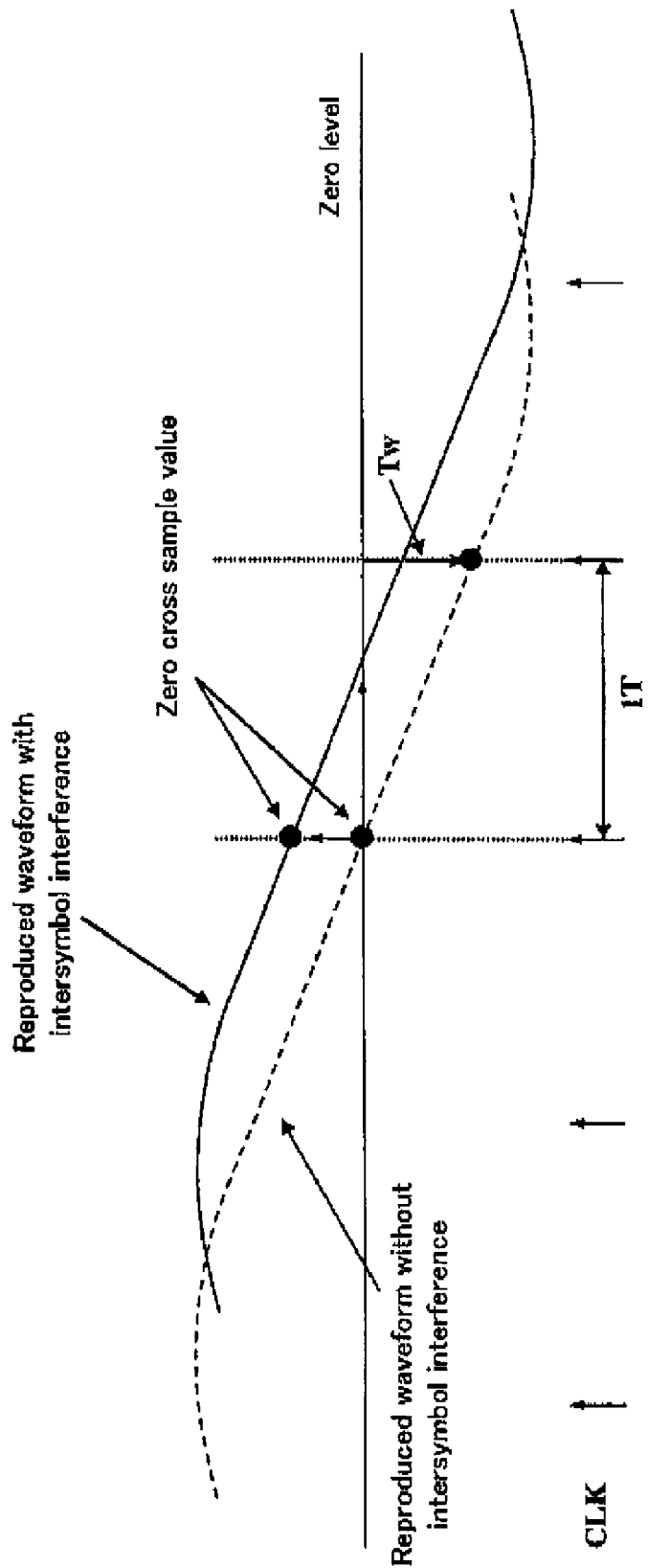

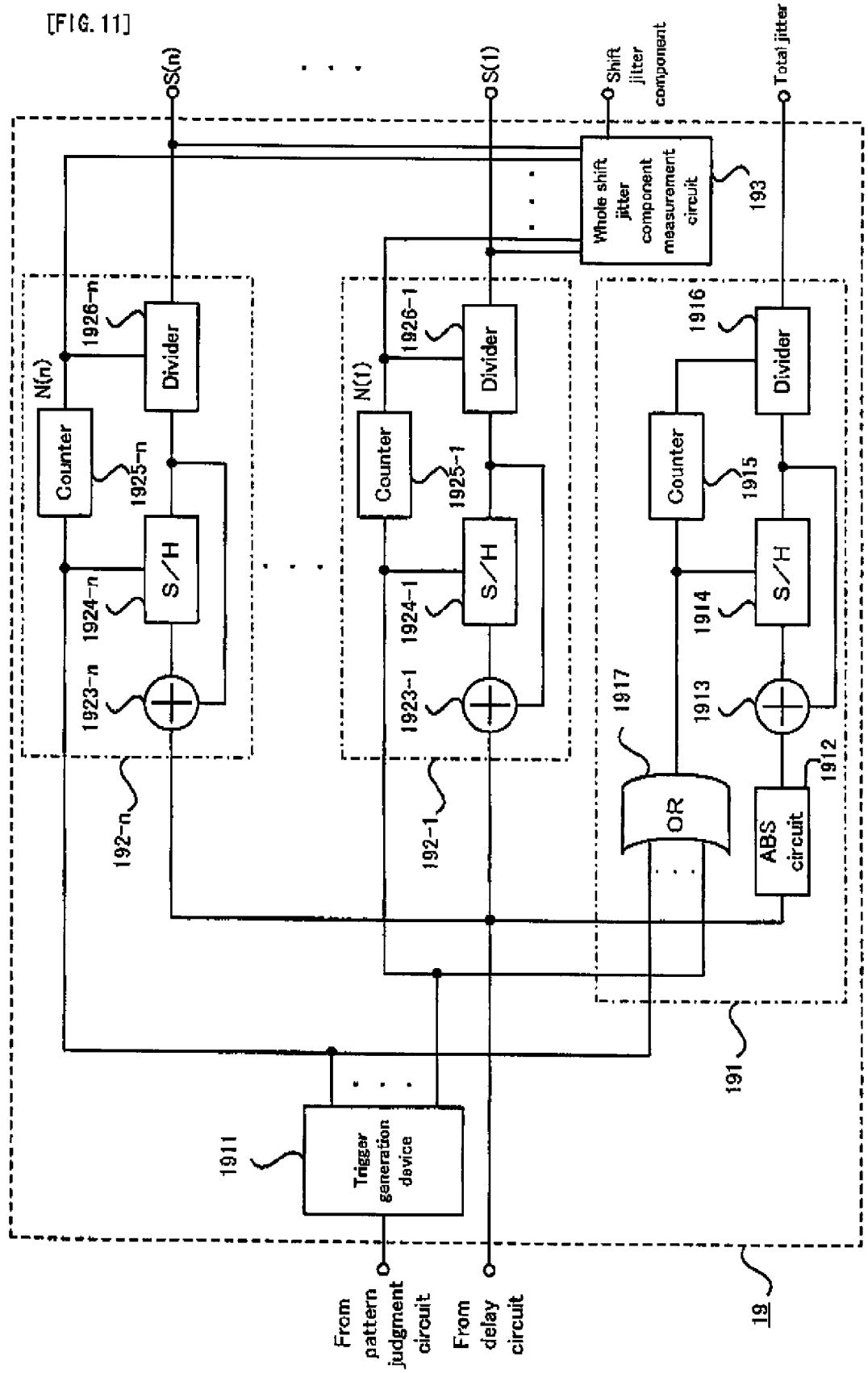
[FIG. 11]

[FIG. 12]
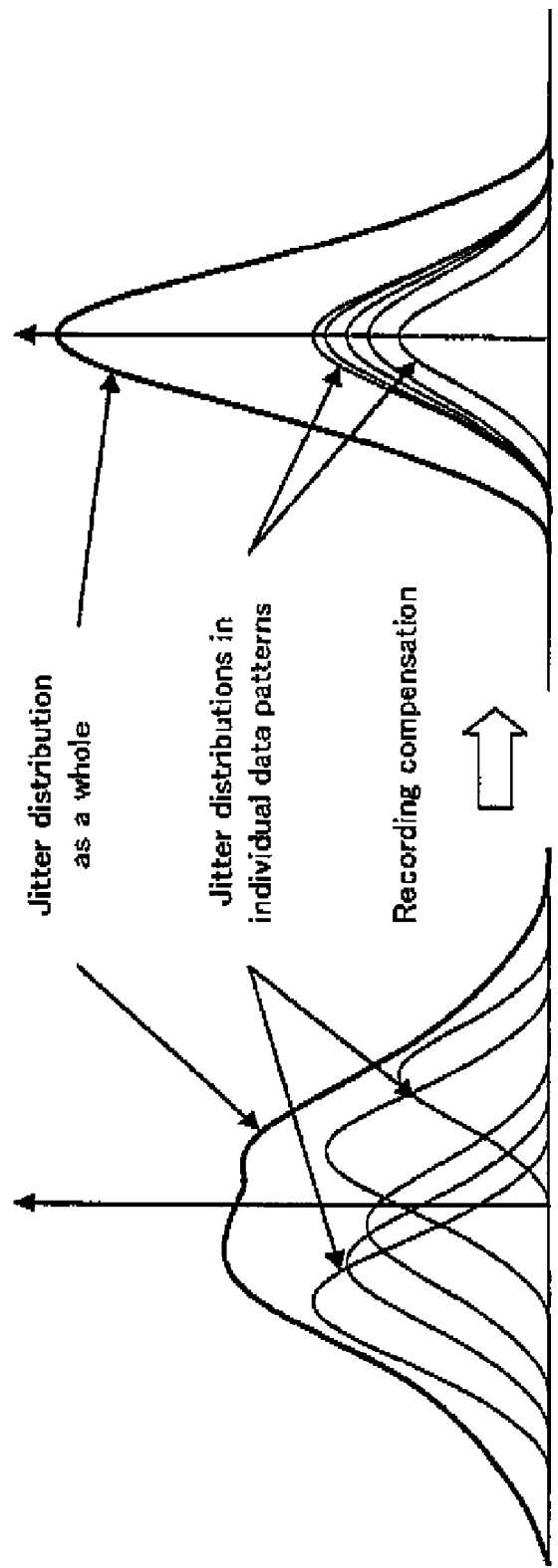

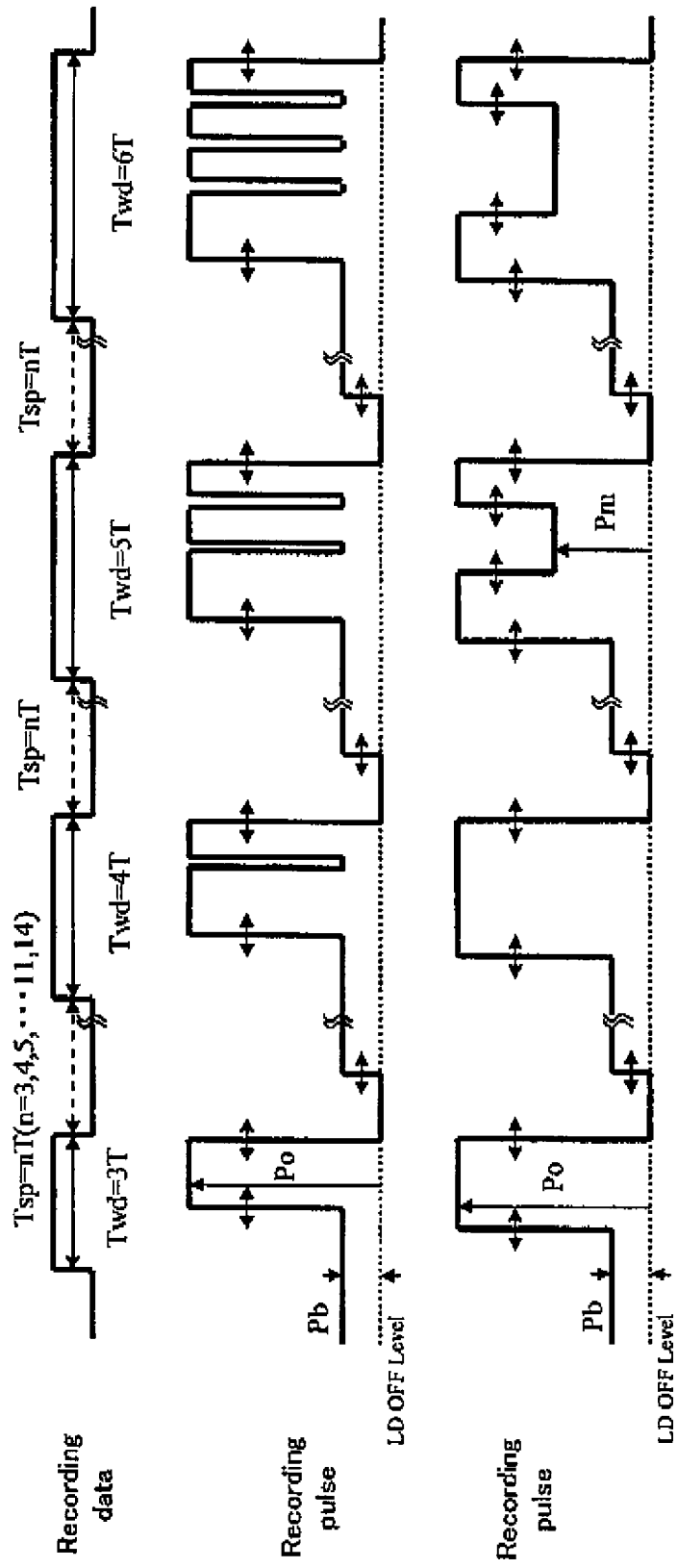
[FIG. 13]

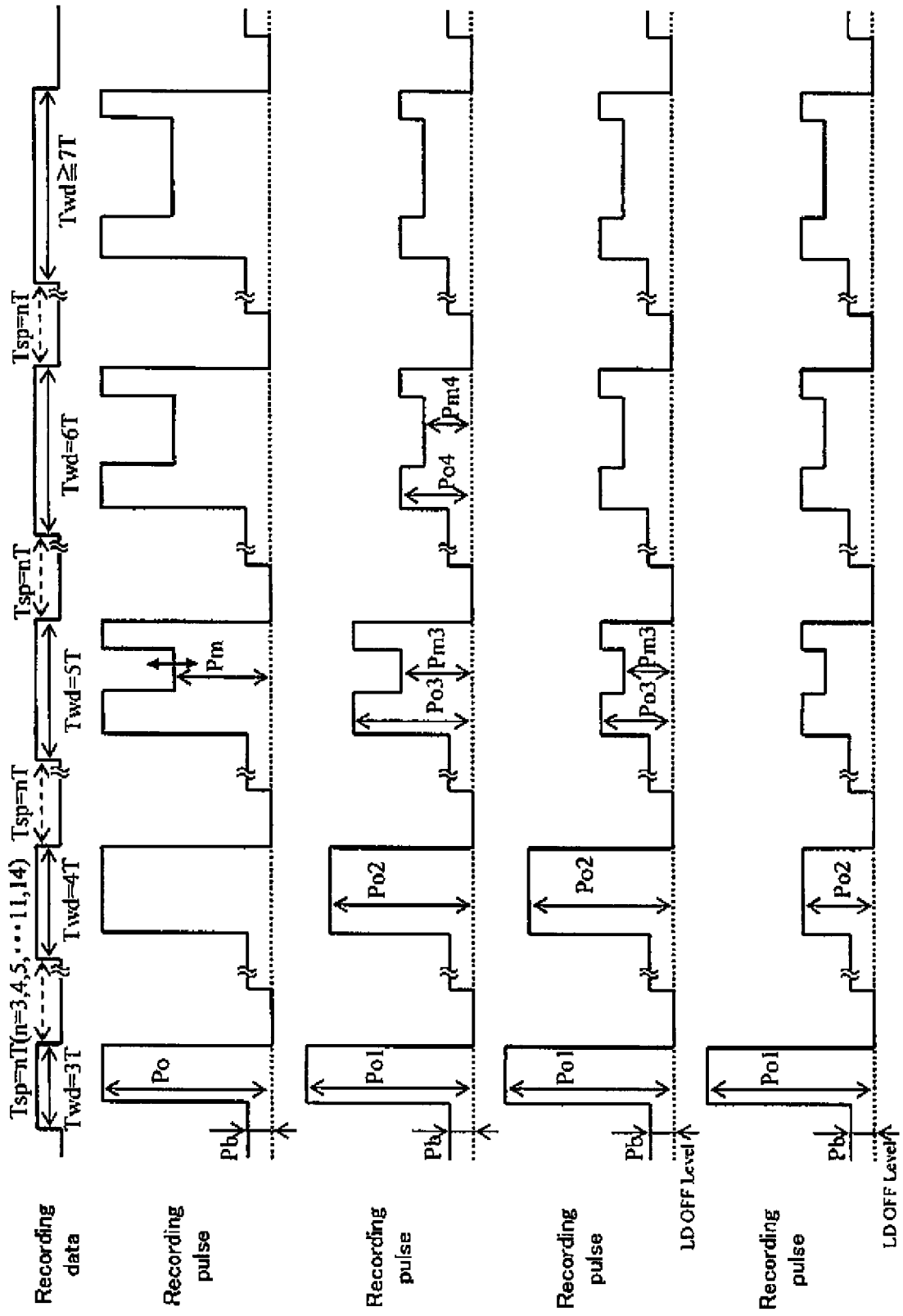
[FIG. 14]

[FIG. 15]
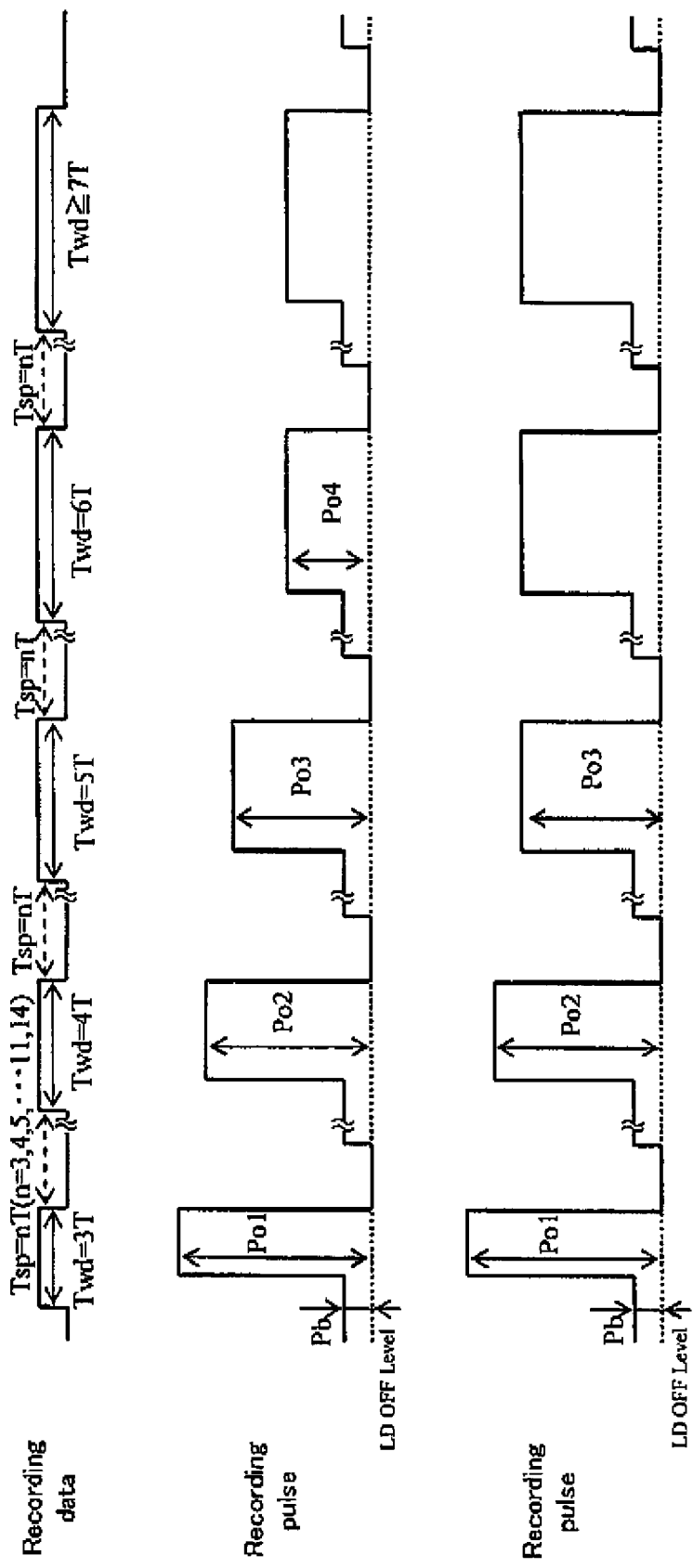

[FIG. 16]
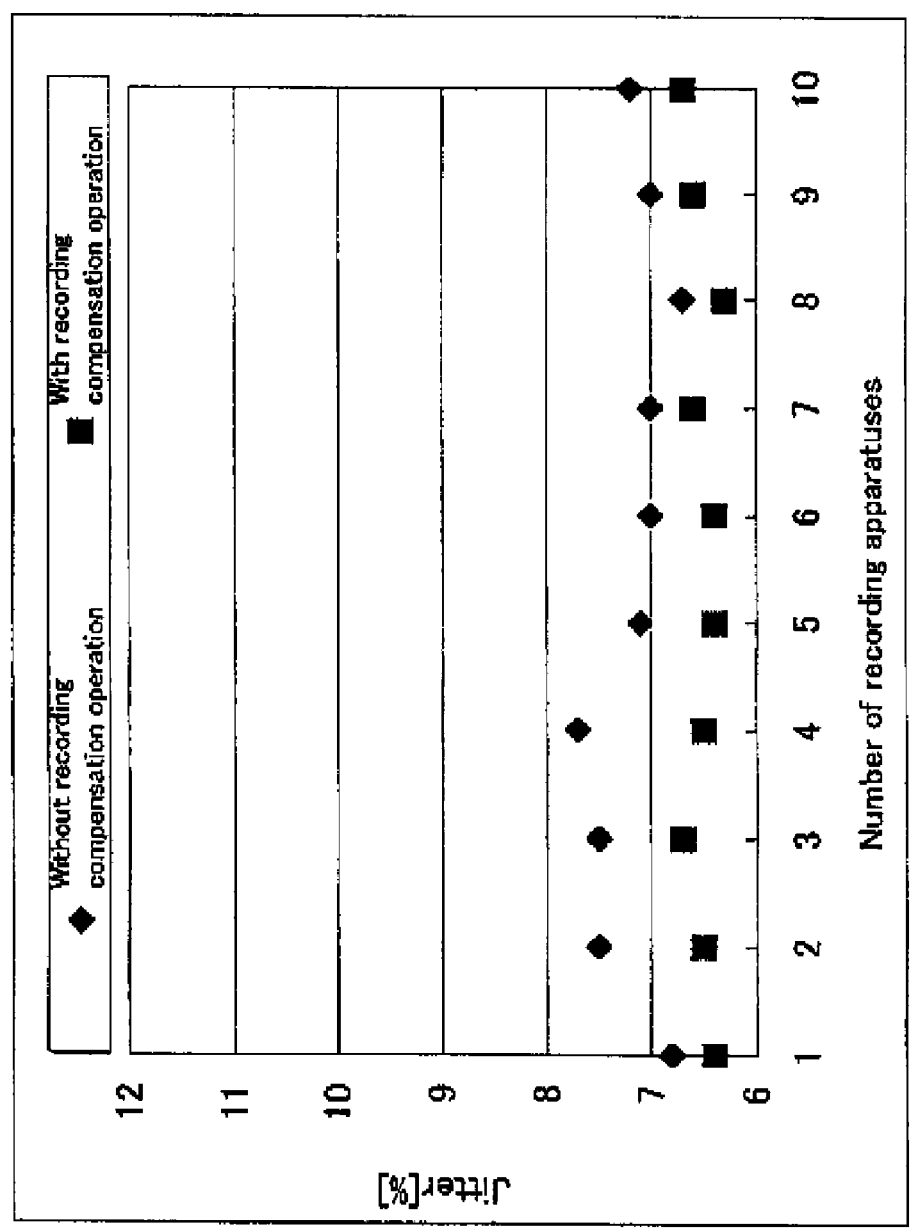

[FIG. 17]
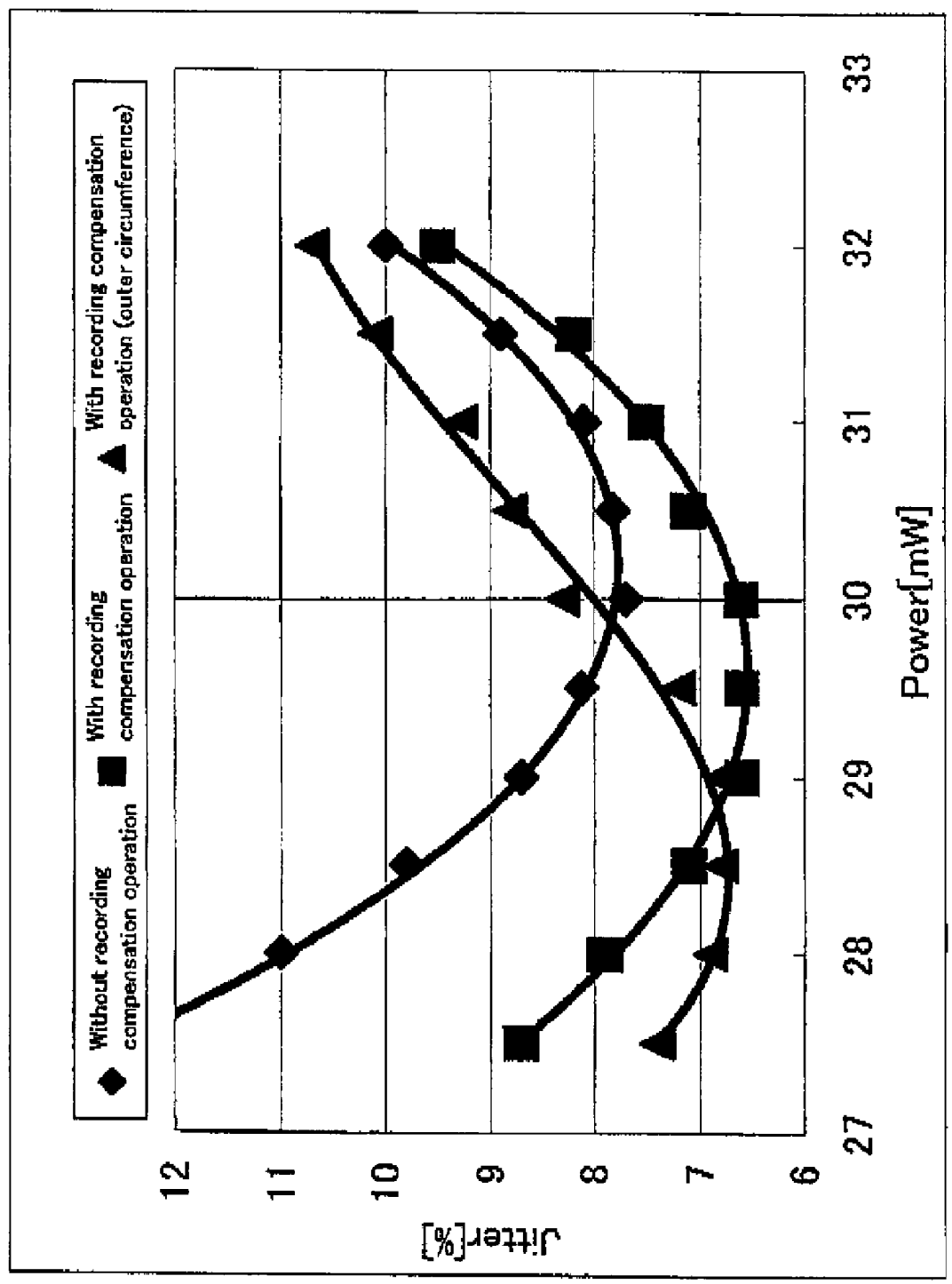

[FIG. 18]
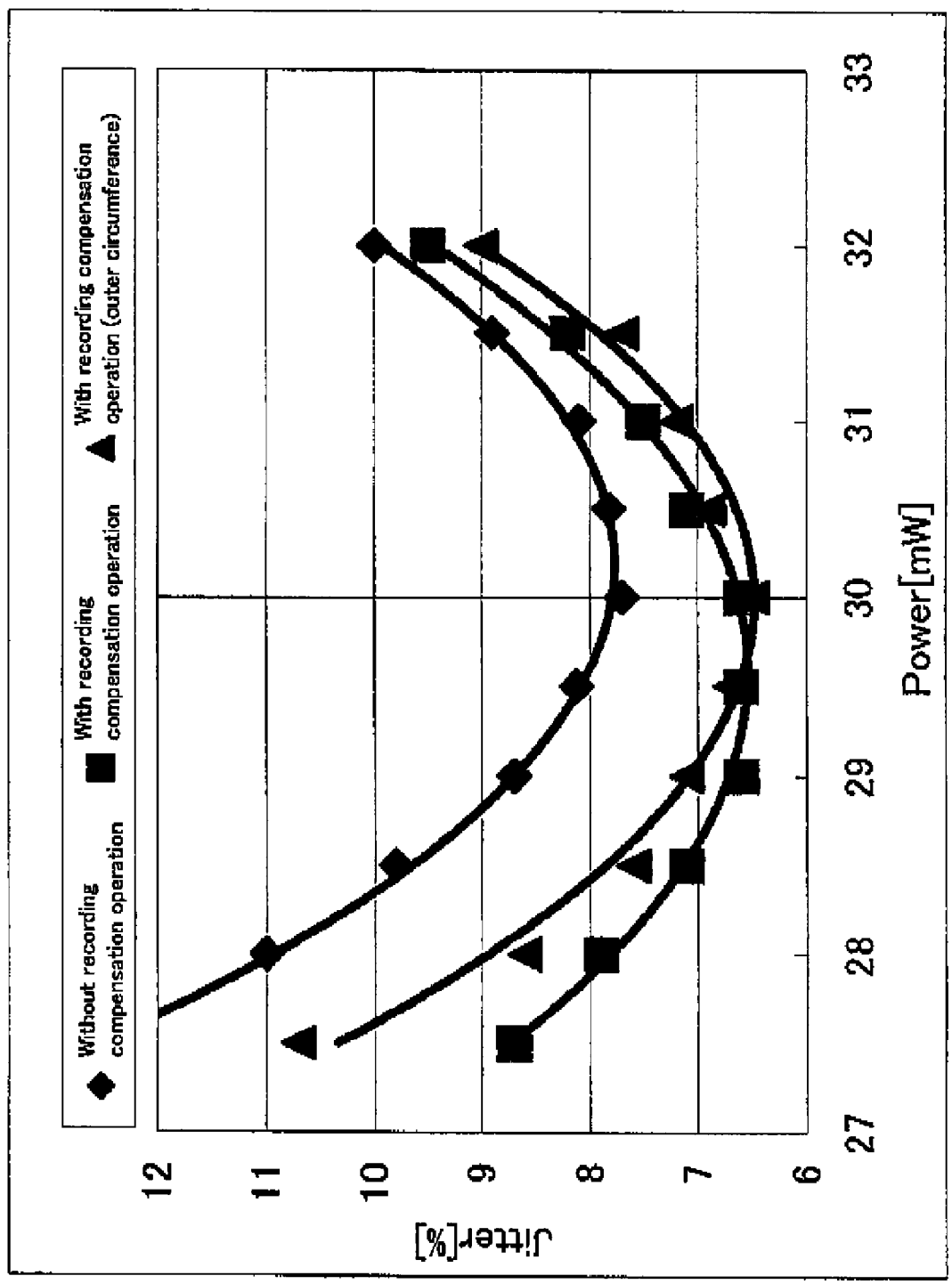

[FIG. 19]
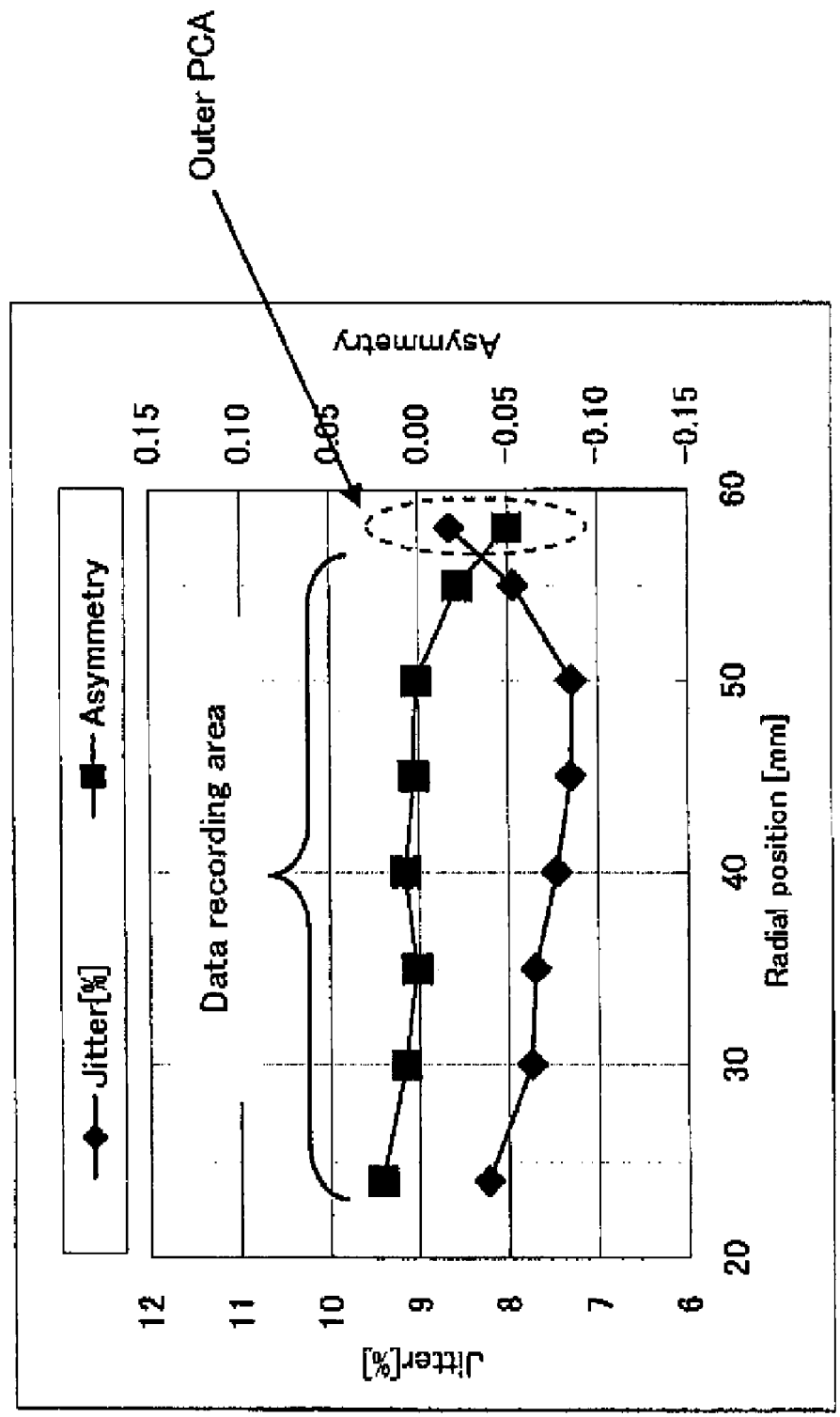

[FIG. 20]
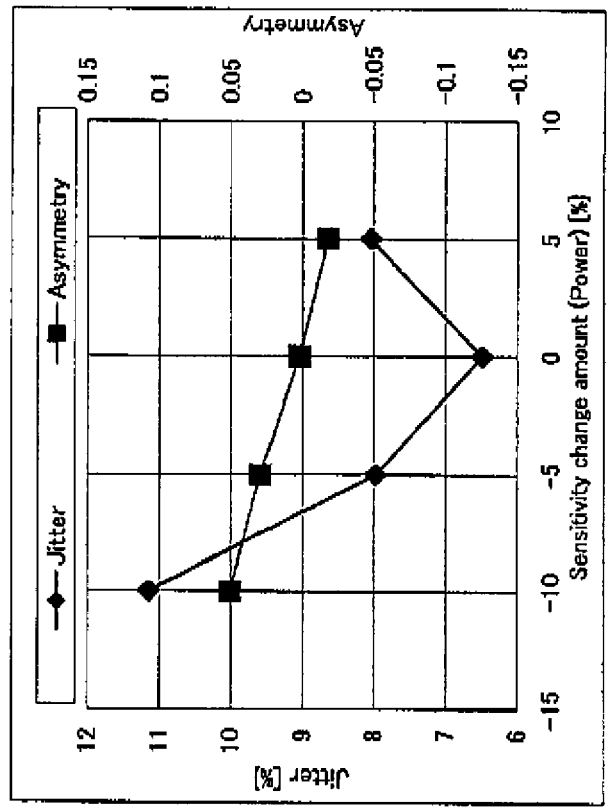
(b)
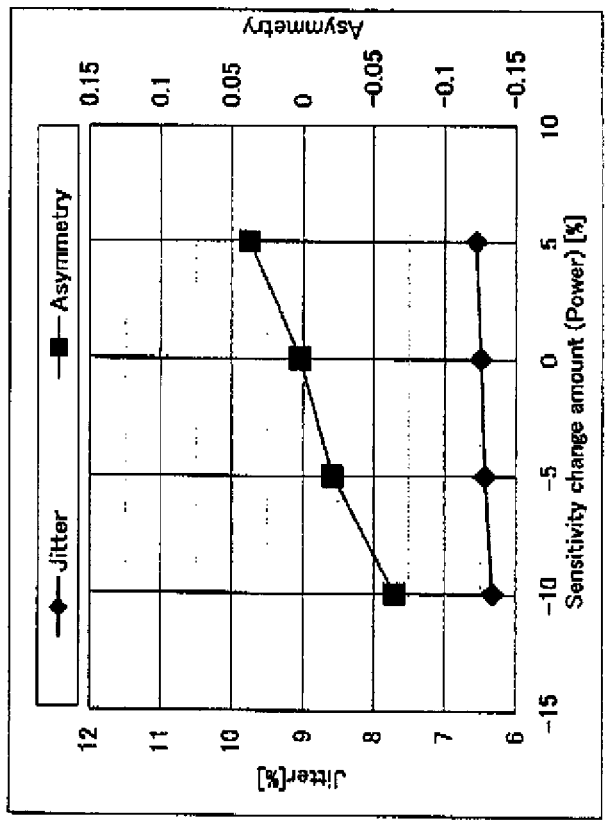
(a)

[FIG. 21]
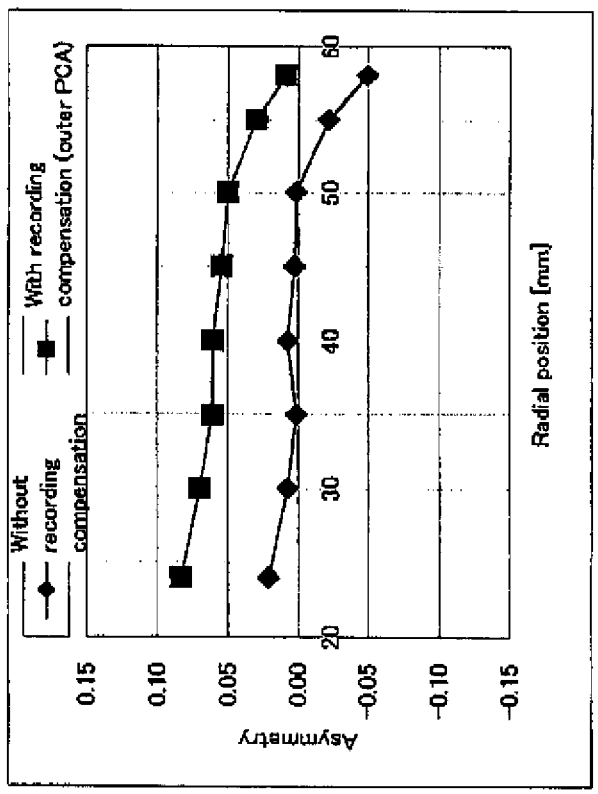
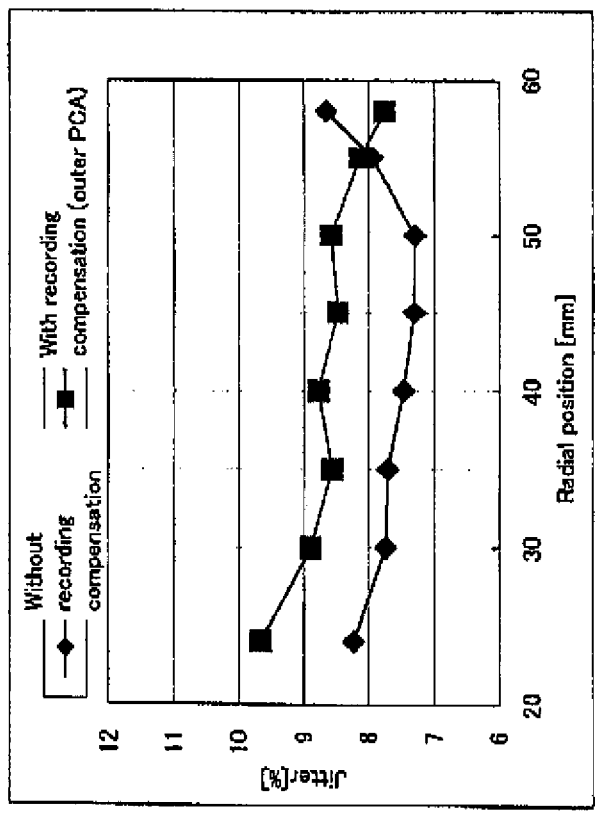

[FIG. 22]
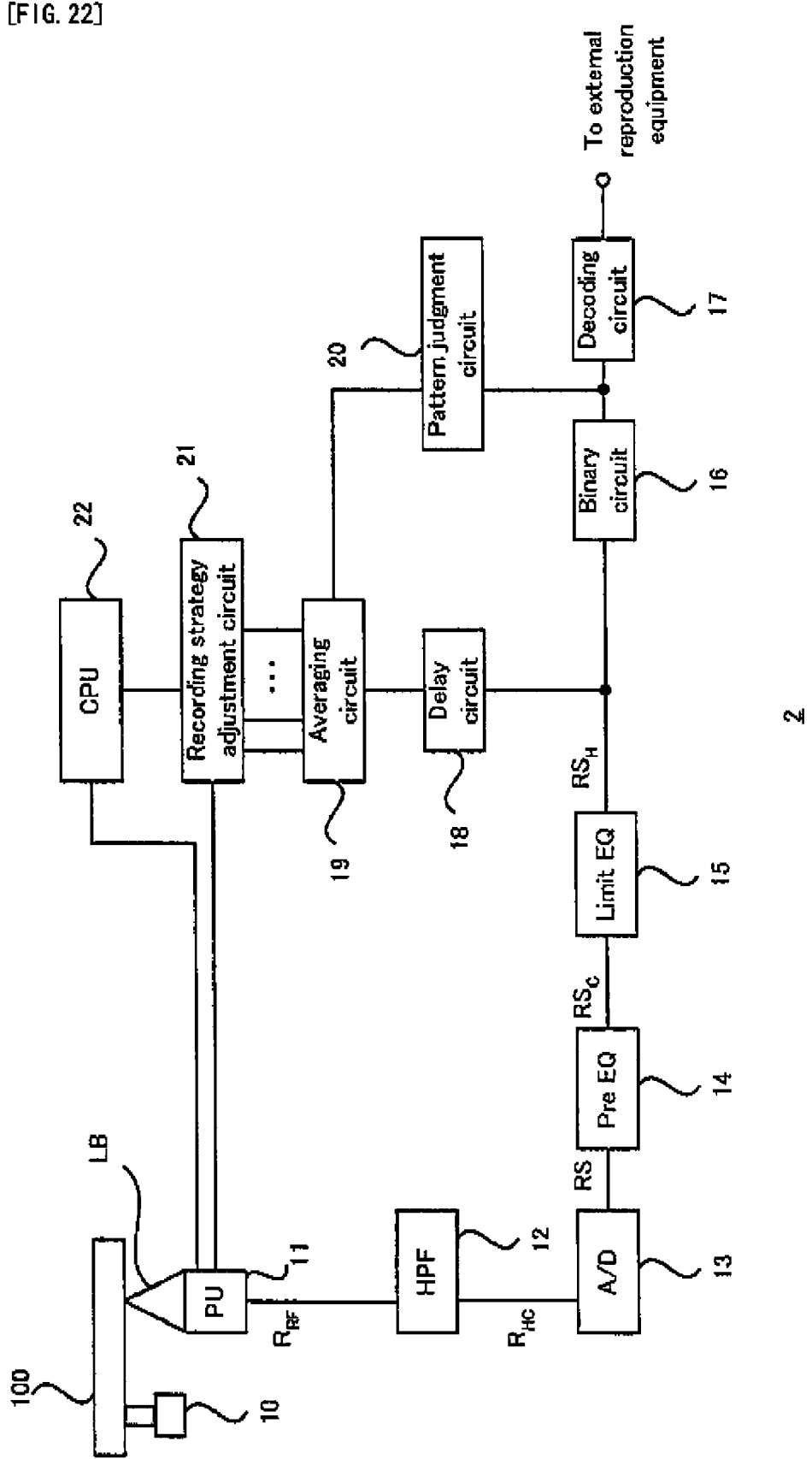

[FIG. 23]
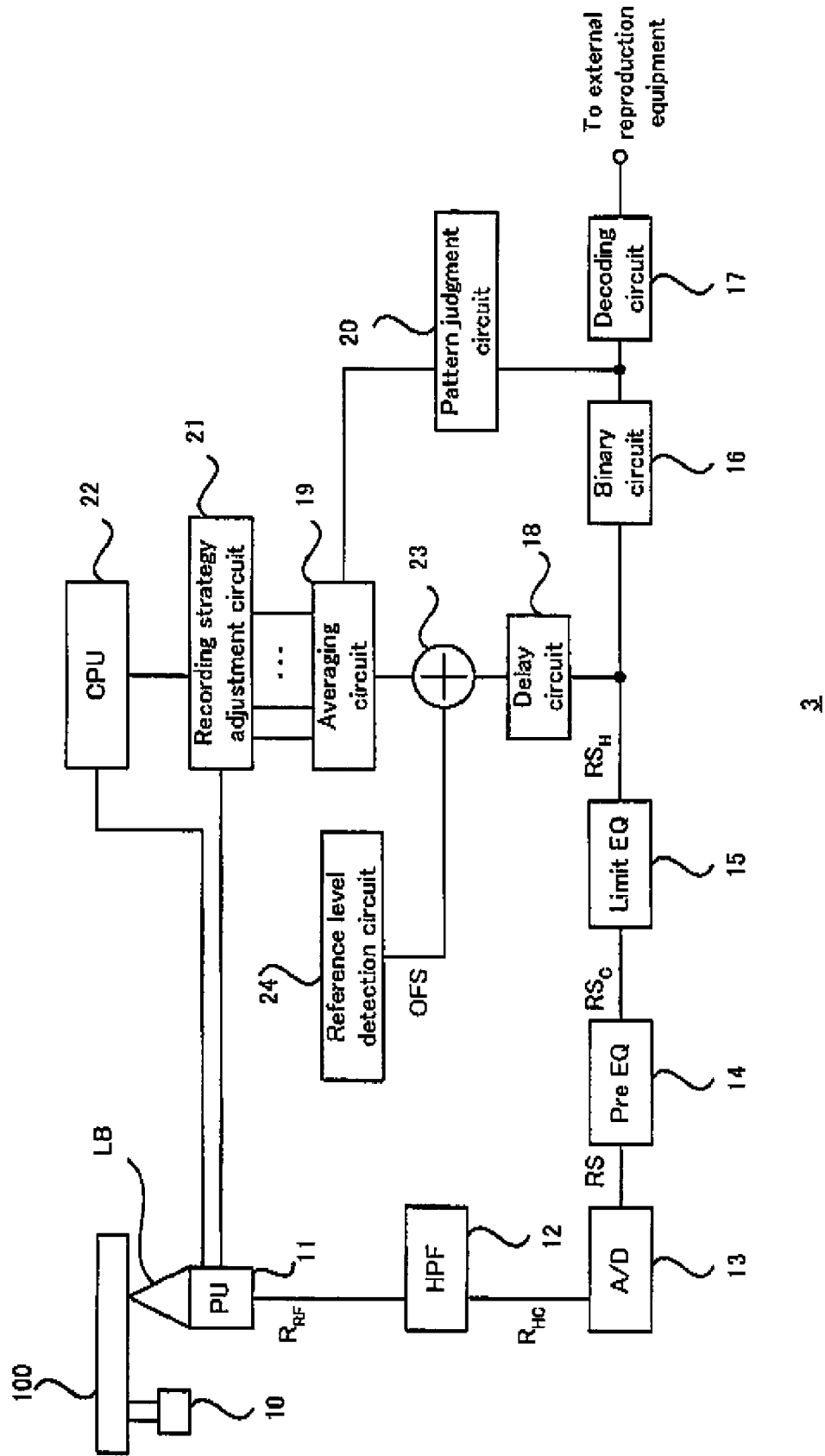

RECORDING APPARATUS AND METHOD, COMPUTER PROGRAM, AND RECORDING MEDIUM

This application is a 371 of PCT/JP2007/065093, filed Aug. 1, 2007.

TECHNICAL FIELD

The present invention relates to a recording apparatus for and a recording method of recording a data pattern onto a recording medium, a computer program which makes a computer function as such a recording apparatus, and the recording medium.

BACKGROUND ART

Optical discs such as a DVD and a Blu-ray disc have been rapidly spread. In such optical discs, various technologies are suggested for OPC (Optimum Power Control) for providing an appropriate power (specifically, recording power) of a laser beam. For example, a patent document 1 discloses a technology of performing the OPC by judging the recording amount of data to be recorded on a recordable recording medium which performs DAO (Disc At Once) and by recording an OPC pattern into an area portion in which the data is not recorded. Moreover, a patent document 2 discloses a technology of predicting an optimum power when the data is recorded into an area between two PCAs (Power Calibration Areas) from the result of the OPC performed in each of the PCA located on the innermost side of the optical disc and the PCA located on the outermost side of the optical disc.

On the other hand, separately from the OPC, various technologies are also disclosed for a recording compensation operation which is an operation of providing an appropriate strategy of the laser beam (i.e. shape of a recording pulse). A patent document 3 discloses one example of the recording compensation operation.

Patent document 1: Japanese Patent Application Laid Open No. 2006-99889
Patent document 2: Japanese Patent Publication No. 3765223
Patent document 3: Japanese Patent Application Laid Open No. 2000-207742

DISCLOSURE OF INVENTION

Subject to be Solved by the Invention

However, in the aforementioned recording compensation operation, in principle, the recording compensation operation is performed in the PCA (Power Calibration Area) located on the innermost side of the optical disc. Moreover, in the case of a relatively high linear velocity which cannot be realized in the PCA located on the innermost side, generally, the recording compensation operation is performed in the PCA (Power Calibration Area) located on the outermost side of the optical disc. On the other hand, it is a user data area located between the two PCAs that a data pattern is actually recorded. Here, in the optical disc (in particular, a DVD-R or the like which is a recordable recording medium), a pigment film which is a recording film is generally formed by spin coating, so that it is considered that there are variations in recording sensitivity of the recording film (in particular, between a recording sensitivity in the PCA located on the outermost side and a recording sensitivity in the user data area). Thus, even if the optimum power in the user data area is predicted by the technology disclosed in the patent document 2, the optimum power is not always optimal in the PCA located on the outermost side in which the recording compensation operation is performed. Thus, if the recording compensation operation is performed in the PCA located on the outermost side by merely using the optimum power calculated by the OPC, the recording properties of the data pattern in the user data area may deteriorate due to an influence of the variations in recording sensitivity, which is technically problematic.

In view of the aforementioned problems, it is therefore an object of the present invention to provide, for example, a recording apparatus and method which can more preferably optimize the strategy by performing the recording compensation operation in a more preferable aspect, as well as a computer program and a recording medium.

Means for Solving the Subject

The above object of the present invention can be achieved by a recording apparatus provided with: a recording device for recording a desired data pattern onto a recording medium provided with an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

The above object of the present invention can be also achieved by a recording method in a recording apparatus provided with: a recording device for recording a desired data pattern onto a recording medium provided with an inner area and a user data area located on an outer side of the inner area, the recording method provided with: a first calculating process of calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling process of controlling the recording device to record the data pattern with the optimum power into an area portion which is outer than an end on an outer side of the recording-scheduled area portion; a second calculating process of calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling process; a second controlling process of controlling the recording device to record the data pattern for adjusting the recording condition with the adjustment power into the area portion which is outer than the end on the outer side of the recording-scheduled area portion; a reading process of reading the data pattern recorded by the control of the second controlling process, thereby obtaining a read signal; a measuring process of measuring jitter of the read signal; an adjusting process of adjusting the recording condition such that the jitter measured by the measuring process satisfies a desired condition; and a third controlling process of controlling the recording device to start the recording of the data pattern into the recording-scheduled area portion by using the optimum power and the recording condition adjusted by the adjusting process.

The above object of the present invention can be also achieved by a computer program for recording control and for controlling a computer provided in a recording apparatus provided with: a recording device for recording a desired data pattern onto a recording medium provided with an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device, the computer program making the computer function as at least one portion of the recording device, the first calculating device, the first controlling device, the second calculating device, the second controlling device, the reading device, the measuring device, the adjusting device, and the third controlling device.

The above object of the present invention can be also achieved by a first recording medium which is provided with an inner area and a user data area located on an outer side of the inner area and on which a data pattern is recorded by a recording apparatus provided with: a recording device for recording the desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

The above object of the present invention can be also achieved by a second recording medium provided with; an inner area; a user data area located on an outer side of the inner area; and a recording condition recording area to record therein a recording condition adjusted by a recording apparatus provided with: a recording device for recording a desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting the recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

The operation and other advantages of the present invention will become more apparent from the embodiments explained below.

BRIEF DESCRIPTION OF DRAWINGS

FIG. 1 is a block diagram conceptually showing the basic structure of a recording apparatus in a first example.

FIG. 2 is a schematic plan view showing the basic structure of an optical disc and a schematic conceptual view showing a recording area structure in the radial direction of the optical disc.

FIG. 3 is a flowchart conceptually showing a flow of operations of the recording apparatus in the first example.

FIG. 4 are area structure diagrams conceptually showing an example of setting an area portion for performing a recording compensation operation targeted at an optical disc in which a lead-in area is pre-recorded.

FIG. 5 are area structure diagrams conceptually showing an example of setting the area portion for performing the recording compensation operation targeted at an optical disc in which the lead-in area is not pre-recorded.

FIG. 6 are area structure diagrams conceptually showing another example of setting the area portion for performing the recording compensation operation.

FIG. 7 is a flowchart conceptually showing a flow of an operation of calculating the power of a laser beam for performing the recording compensation operation.

FIG. 8 are graphs conceptually showing recording properties in an area portion (or a recording-scheduled area portion) in which a data pattern is scheduled to be recorded of a data recording area and recording properties in an area portion (or a recording compensation area) in which the recording compensation operation is performed.

FIG. 9 is a flowchart conceptually showing a flow of the recording compensation operation in a step S109 in FIG. 3.

FIG. 10 is a waveform diagram conceptually showing an operation of measuring jitter by an averaging circuit, on a read sample value series.

FIG. 11 is a block diagram conceptually showing the basic structure of the averaging circuit.

FIG. 12 is a graph conceptually showing the states of shift jitter components in respective data patterns and a shift jitter component as a whole before recording compensation and the states of shift jitter components in respective data patterns and a shift jitter component as a whole after the recording compensation.

FIG. 13 is a timing chart conceptually showing a first aspect of a recording strategy adjustment operation.

FIG. 14 is a timing chart conceptually showing a second aspect of the recording strategy adjustment operation.

FIG. 15 is a timing chart conceptually showing a third aspect of the recording strategy adjustment operation.

FIG. 16 is a graph conceptually showing total jitter of the data patterns recorded without performing the recording compensation operation and total jitter of the data pattern recorded after the recording compensation operation is performed in an aspect associated with the first example.

FIG. 17 is a graph conceptually showing the recording property in the case where the recording compensation operation is performed after calculating an optimum power calculated by OPC without consideration of a difference in recording sensitivity.

FIG. 18 is a graph conceptually showing the recording property in the case where the recording compensation operation is performed after calculating a power for performing the recording compensation operation in consideration of the difference in recording sensitivity.

FIG. 19 a graph in which jitter and asymmetry are associated with the radial position of the optical disc.

FIG. 20 are graphs conceptually showing a relation between the presence of a sensitivity change and the jitter and the asymmetry.

FIG. 21 are waveform diagrams conceptually showing the total jitter and asymmetry of the data pattern recorded by the recording apparatus which does not perform the recording compensation operation and the total jitter and asymmetry of the data pattern recorded by the recording apparatus which has performed the recording compensation operation in an outer PCA, in association with the radial position of the optical disc.

FIG. 22 is a block diagram conceptually showing the basic structure of an information recording apparatus in a second example.

FIG. 23 is a block diagram conceptually showing the basic structure of an information recording apparatus in a third example.

DESCRIPTION OF REFERENCE CODES 1, 2, 3 recording apparatus
10 spindle motor
11 pickup
12 HPF
13 A/D converter
14 pre-equalizer
15 limit equalizer
16 binary circuit
17 decoding circuit
18 delay circuit
19 averaging circuit
20 pattern judgment circuit
21 recording strategy setting circuit
22 CPU
23 adder
24 reference level detection device

BEST MODE FOR CARRYING OUT THE INVENTION

Hereinafter, as the best mode for carrying out the present invention, an explanation will be given on embodiments of the recording apparatus and method, the computer program, and the recording medium of the present invention.

(Embodiment of Recording Apparatus)

An embodiment of the recording apparatus of the present invention is a recording apparatus provided with: a recording device for recording a desired data pattern onto a recording medium provided with an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

According to the embodiment of the recording apparatus of the present invention, by the operation of the recording device, the recording medium is irradiated with a laser beam or the like. As a result, the data pattern according to the data to be recorded is recorded onto the recording medium.

Here, on the recording apparatus in the embodiment, an operation explained below is performed before the operation of recording the data pattern performed by the recording device.

Firstly, by the operation of the first calculating device, the optimum power of the laser beam used in recording the data pattern into the recording-scheduled area portion is calculated.

Then, the area portion which is outer than the end on the outer side of the recording-scheduled area portion (i.e. the area portion in the user data area in which the data pattern according to the data to be recorded is not scheduled to be recorded) is irradiated with the laser beam with the optimum power, and as a result, the data pattern is recorded.

Then, by the operation of the second calculating device, the data pattern recorded by the control of the first controlling device is read. The reading result directly or indirectly indicates the recording sensitivity in the area portion which is outer than the end on the outer side of the recording-scheduled area portion (in other words, the area portion in which the data pattern for adjusting the recording condition is recorded and in which a recording compensation operation is performed). On the other hand, the result of reading a data pattern for test writing, recorded by the operation of the first calculating device, directly or indirectly indicates the recording sensitivity in the recording-scheduled area portion. Thus, the difference becomes clear between the recording sensitivity in the recording-scheduled area portion and the recording sensitivity in the area portion in which the recording compensation operation is performed. The second calculating device calculates the adjustment power used in adjusting the recording condition in the area portion which is outer than the end on the outer side of the recording-scheduled area portion, in consideration of the difference in recording sensitivity.

Then, the recording compensation operation is actually performed. Specifically, firstly, by the control of the second controlling device, the area portion which is outer than the end on the outer side of the recording-scheduled area portion is irradiated with the laser beam with the adjustment power, and as a result, the data pattern for adjusting the recording condition of the recording device is recorded. In other words, the data pattern for adjusting the recording condition of the recording device is recorded into the area portion in the user data area in which the data pattern according to the data to be recorded is not scheduled to be recorded.

Then, the data pattern recorded in the area portion which is outer than the end on the outer side of the recording-scheduled area portion is read by the operation of the reading device. As a result, the read signal is obtained. Then, by the operation of the measuring device, the jitter of the read signal is detected. Then, by the operation of the adjusting device, the recording condition of the recording device is adjusted such that the detected jitter satisfies the desired condition.

After the recording condition is adjusted, the recording of the data pattern into the user data area is actually started by the control of the third controlling device. In this case, the power of the laser beam is set to the optimum power calculated by the first calculating device, and the recording condition is set to the recording condition adjusted by the adjusting device.

By this, the jitter of the read signal obtained by reading the data pattern recorded after the adjustment of the recording condition satisfies the desired condition. Therefore, it is possible to improve the reading quality of the read signal (in other words, recording quality or reproduction quality).

In particular, in the embodiment, before the data pattern for adjusting the recording condition is recorded (i.e. before the recording compensation operation is performed), the power of the laser beam is corrected in consideration of the difference between the recording sensitivity in the recording-scheduled area portion and the recording sensitivity in the area portion in which the recording compensation operation is performed.

Here, consideration is given to the operation of performing the recording compensation operation in the area portion which is outer than the end on the outer side of the recording-scheduled area portion (i.e. recording the data pattern for adjusting the recording condition) by using the optimum power in the recording-scheduled area portion without consideration of the difference in recording sensitivity. In this case, the optimum power in the recording-scheduled area portion is not necessarily optimal in the area portion in which the recording compensation operation is performed. Thus, the recording compensation operation is likely performed with the power which is not optimal in the area portion in which the recording compensation operation is performed. This is not preferable from the viewpoint of preferable adjustment of the recording condition.

In the embodiment, however, the power of the laser beam for performing the recording compensation operation is calculated in consideration of the difference in recording sensitivity as described above, so that the recording compensation operation is performed with the optimum power in the area portion in which the recording compensation operation is performed. On the other hand, when the data pattern according to the data to be recorded is actually recorded into the user data area, the optimum power calculated by the first calculating device and the recording condition adjusted by the adjusting device are used, so that the data pattern can be preferably recorded in the user data area. In other words, the data pattern can be recorded without deteriorating the recording quality of the data pattern.

In addition, in the embodiment, the recording compensation operation can be performed by recording the data pattern into the area portion which is closer to the area portion in the user data area in which the data pattern is actually recorded (i.e. the recording-scheduled area portion) in comparison with the area portion such as a PCA disposed on the innermost side or the outermost side. Thus, the properties (e.g. the recording sensitivity) of the area portion in which the recording compensation operation is performed are rarely far removed from the properties (e.g. the recording sensitivity) of the area portion in which the data pattern according to the data to be recorded is actually recorded. By this, in comparison with a case where the recording compensation operation is performed in the area portion such as a PCA disposed on the innermost side or the outermost side, the recording condition optimized by the recording compensation operation is highly likely preferable or optimal even in the area portion in which the data pattern is actually recorded. In other words, by performing the recording compensation operation in a more preferable aspect, it is possible to optimize the recording condition, more preferably. Therefore, the data pattern can be preferably recorded into the user data area by using the recording condition optimized by the recording compensation operation.

Incidentally, in the embodiment, due to the correction considering the recording sensitivity described above, even if the recording-scheduled area portion and the recording compensation area are located away from each other, it is not considered to be particularly problematic. However, considering the fact that it is more preferable that the properties in the recording-scheduled area portion are closer to the properties in the recording compensation area, the recording-scheduled area portion is preferably closer to the recording compensation area. In this regard, in the embodiment, it is possible to receive such a great effect that the recording compensation operation can be performed, more preferably.

Moreover, in the aforementioned background art (particularly, the patent document 3), a special data pattern for OPC is recorded. Thus, considering that bringing the area portion in which the special data pattern is recorded close to the recording-scheduled area portion may cause a runaway operation if a reproducing apparatus mistakenly reads the special data pattern, it is not preferable. On the other hand, according to the embodiment, in order to perform the recording compensation operation, a normal data pattern is recorded. Thus, even if the reproducing apparatus reads the data pattern by bringing the area portion in which the normal data pattern is recorded close to the recording-scheduled area portion, that does not cause the runway operation. Even in this regard, according to the embodiment, it is possible to receive excellent effects in comparison with the background art.

In one aspect of the embodiment of the recording apparatus of the present invention, the second calculating device calculates the adjustment power which allows optimum recording properties of the data pattern recorded by the control of the first controlling device.

According to this aspect, it is possible to perform the recording compensation operation with the adjustment power which is optimum in the area portion in which the recording compensation operation is performed, in consideration of the difference between the recording sensitivity in the recording-scheduled area portion and the recording sensitivity in the area portion in which the recording compensation operation is performed. Thus, it is possible to improve the recording quality of the data pattern.

In another aspect of the embodiment of the recording apparatus of the present invention, the second calculating device calculates the adjustment power which absorbs (in other words, cancels) the difference between the recording sensitivity in the recording-scheduled area portion and the recording sensitivity in the area portion which is outer than the end on the outer side of the recording-scheduled area portion.

According to this aspect, it is possible to perform the recording compensation operation with the adjustment power which is optimum in the area portion in which the recording compensation operation is performed, in consideration of the difference between the recording sensitivity in the recording-scheduled area portion and the recording sensitivity in the area portion in which the recording compensation operation is performed. Thus, it is possible to improve the recording quality of the data pattern which accords to the data to be recorded into the user data area and which is recorded with the optimum power.

In another aspect of the embodiment of the recording apparatus of the present invention, the first calculating device calculates the optimum power, which is used in recording the data pattern at a first linear velocity into the recording-scheduled area portion, by controlling the recording device to record the data pattern for test writing at a second linear velocity, which is lower than the first linear velocity, in the inner area before the data pattern is recorded at the first linear velocity into the recording-scheduled area portion, the first controlling device controls the recording device to record the data pattern with the optimum power and at the first linear velocity into the area portion which is outer than the end on the outer side of the recording-scheduled area portion, the second calculating device calculates the adjustment power, which is used in adjusting the recording condition of the recording device at the first linear velocity in the area portion which is outer than the end on the outer side of the recording-scheduled area portion, in consideration of the difference between the recording sensitivity in the recording-scheduled area portion and the recording sensitivity in the area portion which is outer than the end on the outer side of the recording-scheduled area portion, by reading the data pattern recorded by the control of the first controlling device, the second controlling device controls the recording device to record the data pattern for adjusting the recording condition with the adjustment power and at the first linear velocity into the area portion which is outer than the end on the outer side of the recording-scheduled area portion, and the third controlling device controls the recording device to start the recording of the data pattern into the recording-scheduled area portion at the first linear velocity by using the optimum power and the recording condition adjusted by the adjusting device.

According to this aspect, firstly, by the operation of the first calculating device, the optimum power of the laser beam used in recording the data pattern into the recording-scheduled area portion at the first linear velocity is calculated on the basis of the data pattern for test writing recorded in the inner area at the second linear velocity. In other words, by recording the data pattern for test writing at the second linear velocity which can be realized in the inner area, instead of the first linear velocity which cannot be realized in the inner area, the optimum power used in recording the data pattern into the recording-scheduled area at the first linear velocity is calculated.

Here, the first calculating device may predict or estimate the optimum power used at the first linear velocity which cannot be realized in the inner area, on the basis of the result of reading the data pattern for test writing recorded at the second linear velocity which can be realized in the inner area. In this case, as described later, the data pattern for test writing may be recorded by using a special recording strategy (i.e. recording condition) which allows the aforementioned prediction operation. Alternatively, the optimum power in the area portion other than the inner area may be predicted by interpolation on the basis of a correlation between the recording quality of the data pattern for test writing and the recording power.

Then, by the control of the first controlling device, the area portion which is outer than the end on the outer side of the recording-scheduled area portion (i.e. the area portion in the user data area in which the data pattern according to the data to be recorded is not scheduled to be recorded) is irradiated with the laser beam with the optimum power at the first linear velocity, and as a result, the data pattern is recorded.

Then, by the operation of the second calculating device, the adjustment power used in adjusting the recording condition at the first linear velocity in the area portion which is outer than the end on the outer side of the recording-scheduled area portion is calculated in consideration of the difference in recording sensitivity.

Then, the recording compensation operation is actually performed. Specifically, firstly, by the control of the second controlling device, the area portion which is outer than the end on the outer side of the recording-scheduled area portion is irradiated with the laser beam with the adjustment power at the first linear velocity, and as a result, the data pattern for adjusting the recording condition of the recording device is recorded. In other words, the data pattern for adjusting the recording condition of the recording device is recorded into the area portion in the user data area in which the data pattern according to the data to be recorded is not scheduled to be recorded.

Then, by the operation of the reading device, the data pattern recorded in the area portion which is outer than the end on the outer side of the recording-scheduled area portion is read. As a result, the read signal is obtained. Then, by the operation of the measuring device, the jitter of the read signal is detected. Then, by the operation of the adjusting device, the recording condition of the recording device is adjusted such that the detected jitter satisfies the desired condition.

After the adjustment of the recording condition, by the control of the third controlling device, the recording of the data pattern according to the data to be recorded into the user data area at the first linear velocity is started. In this case, the power of the laser beam is set to the optimum power calculated by the first calculating device, and the recording condition is set to the recording condition adjusted by the adjusting device.

In this aspect, the first calculating device may calculate the optimum power if the data pattern for adjusting the recording condition at the first linear velocity cannot be recorded into the inner area, the first controlling device may control the recording device to record the data pattern with the optimum power and at the first linear velocity into the area portion which is outer than the end on the outer side of the recording-scheduled area portion if the data pattern for adjusting the recording condition at the first linear velocity cannot be recorded into the inner area, the second calculating device may calculate the adjustment power if the data pattern for adjusting the recording condition at the first linear velocity cannot be recorded into the inner area, and the second controlling device may control the recording device to record the data pattern for adjusting the recording condition with the adjustment power and at the first linear velocity into the area portion which is outer than the end on the outer side of the recording-scheduled area portion if the data pattern for adjusting the recording condition at the first linear velocity cannot be recorded into the inner area.

By virtue of such construction, in the case of a relatively high linear velocity which cannot be realized in the inner area disposed on the inner side (e.g. PCA), it is possible to perform the recording compensation operation in the area portion which is closer to the area portion in the user data area in which the data pattern according to the data to be recorded is actually recorded (i.e. the recording-scheduled area portion), instead of performing the recording compensation operation in an outer area disposed on the outermost side. This eliminates a need to perform the recording compensation operation in the area portion on the outermost side in which the recording properties may vary widely. As described above, by performing the recording compensation operation in a more preferable aspect, it is possible to optimize the recording condition, more preferably.

In another aspect of the embodiment of the recording apparatus of the present invention, it is further provided with: an amplitude limit filtering device for limiting an amplitude level of the read signal by using a predetermined amplitude limit value, thereby obtaining an amplitude limit signal and for performing a high-frequency emphasis filtering process on the amplitude limit signal, thereby obtaining an equalization-corrected signal; and a detecting device for detecting the data pattern of the equalization-corrected signal, the measuring device measuring jitter of the equalization-corrected signal, the adjusting device adjusting the recording condition such that the jitter measured by the measuring device satisfies a desired condition, with reference to the data pattern detected by the detecting device.

According to this aspect, by the operation of the amplitude limit filtering device, the amplitude level of the read signal is limited. Specifically, in a signal component of the read signal whose amplitude level is greater than an upper limit of the amplitude limit value or whose amplitude level is less than a lower limit of the amplitude limit value, its amplitude level is limited to the upper limit or the lower limit of the amplitude limit value. On the other hand, in a signal component of the read signal whose amplitude level is less than or equal to the upper limit of the amplitude limit value or whose amplitude level is greater than or equal to the lower limit of the amplitude limit value, its amplitude level is not limited. As described above, the read signal whose amplitude level is limited is referred to as the amplitude limit signal. Moreover, the amplitude limit filtering device performs the high-frequency emphasis filtering process on the amplitude limit signal. As a result, the equalization-corrected signal is obtained in which the shortest data pattern included in the read signal (e.g. the data pattern with a run length of 3T if the information recording medium is a DVD, and the data pattern with a run length of 2T if the information recording medium is a Blu-ray Disc) has an emphasized amplitude level. In other words, the amplitude limit filtering device performs the same operation as a so-called limit equalizer, on the read signal.

Then, by the operation of the measuring device, the jitter of the equalization-corrected signal is measured, instead of measuring the jitter of the read signal. In other words, in this aspect, instead of directly using the read signal obtained by reading the data pattern from the recording medium to measure the jitter, the equalization-corrected signal obtained by performing the amplitude limit process and the high-frequency emphasis filtering process on the read signal is used to measure the jitter.

Moreover, by the operation of the detecting device, the data pattern of the equalization-corrected signal is detected. More specifically, it is detected which run length the data pattern of the equalization-corrected signal has. The detected data pattern is referred to in the operation of adjusting the recording condition by the adjusting device.

As described above, the data pattern is detected from the equalization-corrected signal in which the amplitude level of the shortest data pattern is emphasized by the operation of the amplitude limit filtering device (i.e. limit equalizer). Thus, in any state of the asymmetry of the read signal, it is possible to preferably prevent such a disadvantage that the shortest data pattern included in the read signal does not cross a zero level. As a result, the shortest data pattern can be preferably detected. Thus, it is possible to preferably adjust the recording condition for recording the shortest data pattern. By this, the recording compensation operation can be preferably performed with reference to the read signal including the shortest data pattern. In other words, regardless of the state of the asymmetry in the read signal before the recording compensation, the recording compensation operation can be preferably performed.

In another aspect of the embodiment of the recording apparatus of the present invention, it is further provided with an adding device for adding a predetermined offset signal to the read signal, thereby obtaining an offset-added signal, the measuring device measuring the jitter of the offset-added signal.

According to this aspect, the jitter of the offset-added signal is measured. Incidentally, for the offset signal, it is preferable to set a signal which allows the asymmetry of the read signal after the recording compensation operation to have a desired value, as occasion demands. Thus, in accordance with the addition of the offset signal, it is possible to set the asymmetry of the read signal after the recording compensation, regardless of the state of the asymmetry before the recording compensation.

In another aspect of the embodiment of the recording apparatus of the present invention, the measuring device measures, as the jitter, a shift jitter component caused by a state of the recorded data pattern from among the jitter, and the adjusting device adjusts the recording condition such that the shift jitter component as the jitter satisfies the desired condition.

According to this aspect, not the random jitter component, which is hardly predicted or which cannot be predicted, but the shift jitter component caused by the state of the data pattern which depends on the recording condition is measured. Therefore, by adjusting the recording condition, it is possible to preferably perform the recording compensation operation such that the shift jitter component satisfies the desired condition, relatively easily.

In an aspect of the recording apparatus in which the recording condition is adjusted such that the shift jitter component satisfies the desired condition, as described above, a state in which the jitter satisfies the desired condition may be a state in which the shift jitter component is less than or equal to a first predetermined value.

By virtue of such construction, it is possible to preferably perform the recording compensation operation so as to reduce the shift jitter component.

In an aspect of the recording apparatus in which the recording condition is adjusted such that the shift jitter component satisfies the desired condition, as described above, a state in which the jitter satisfies the desired condition is a state in which the shift jitter components in a plurality of types of respective data patterns with different run lengths may be substantially same to each other.

By virtue of such construction, it is possible to match the shift jitter components in a plurality of types of respective data patterns (e.g. 10 types of data patterns with run lengths of 3T to 11T and 14T if the information recording medium is a DVD, and 7 types of data patterns with run lengths of 2T to 9T if the information recording medium is a Blu-ray Disc). In other words, instead of narrowing jitter distributions in the respective data patterns, it is possible to match the average values of the jitter distributions in the respective data patterns (i.e. the shift jitter components). By this, it is possible to perform the recording compensation operation which reduces the jitter, preferably and relatively easily.

In an aspect of the recording apparatus in which the recording condition is adjusted such that the shift jitter component satisfies the desired condition, as described above, a state in which the jitter satisfies the desired condition may be a state in which a ratio of a random jitter component, which is caused by a noise from among the jitter, to the jitter is greater than or equal to a second predetermined value.

The jitter is indicated by the square root of a sum of the square of the random jitter component and the square of the shift jitter component. Thus, if the random jitter component is greater than the shift jitter component (i.e. if the ratio of the random jitter component to the jitter is relatively large), the jitter is hardly reduced even if the shift jitter component is reduced. Therefore, by virtue of such construction, it is possible to perform the recording compensation operation such that a jitter-reduction effect is preferably achieved by the adjustment of the recording condition. In other words, it is possible to preferably avoid the inefficient recording compensation operation in which the jitter-reduction effect is not preferably achieved by the adjustment of the recording condition.

In an aspect of the recording apparatus in which the recording condition is adjusted such that the shift jitter component satisfies the desired condition, as described above, the measuring device may measure, as the shift jitter component, an average value in each data pattern of sample values of the read signal or the equalization-corrected signal which is the closest to a zero level point By virtue of such construction, it is possible to measure the shift jitter component, preferably and relatively easily.

In an aspect of the recording apparatus in which the recording condition is adjusted such that the shift jitter component satisfies the desired condition, as described above, the adjusting device may preferentially adjust the recording condition in recording the data pattern having the relatively large shift jitter component out of a plurality of type of the data patterns with different run lengths.

By virtue of such construction, it is possible to reduce the jitter more efficiently, in comparison with the construction that the recording condition in each data pattern is randomly adjusted.

In another aspect of the embodiment of the recording apparatus of the present invention, the recording device applies a laser beam, thereby recording the data pattern, and the recording condition is at least one of an amplitude and a pulse width of the laser beam or a driving pulse for driving the laser beam.

By virtue of such construction, it is possible to preferably perform the recording compensation operation by adjusting the amplitude and the pulse width of the driving pulse or the laser beam.

In another aspect of the embodiment of the recording apparatus of the present invention, the recording device records the recording condition adjusted by the adjusting device. In this case, the recording condition is preferably recorded in association with identification information for identifying the information recording apparatus.

According to this aspect, the identification information about the recording apparatus and the recording condition are recorded on the recording medium. Thus, by reading the recording condition, which corresponds to the identification information about the recording apparatus, from the recording medium and by using it as the recording condition of the recording device when the data pattern is recorded by the recording apparatus, it is possible to receive the same various effects as those described above, in the recording operation performed on the recording medium, without adjusting the recording condition again.

Moreover, even if the recording condition is not recorded on the recording medium for the reason that the recording medium is blank or the like, in the embodiment, it is possible to preferably perform the recording compensation operation. Moreover, if the resulting recording condition is recorded on the recording medium in association with the identification information about the recording apparatus, it is possible to receive the same various effects as those described above, in the recording performed on the recording medium, without adjusting the recording condition again next time the data pattern is recorded.

In other words, according to this aspect, without adjusting the recording condition by the adjusting device or with the recording condition adjusted at least once, it is possible to receive the same various effects as those described above, in the recording performed on the recording medium, without adjusting the recording condition on the corresponding recording apparatus again.

(Embodiment of Recording Method)

An embodiment of the recording method of the present invention is a recording method in a recording apparatus provided with: a recording device for recording a desired data pattern onto a recording medium provided with an inner area and a user data area located on an outer side of the inner area, the recording method provided with: a first calculating process of calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling process of controlling the recording device to record the data pattern with the optimum power into an area portion which is outer than an end on an outer side of the recording-scheduled area portion; a second calculating process of calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling process; a second controlling process of controlling the recording device to record the data pattern for adjusting the recording condition with the adjustment power into the area portion which is outer than the end on the outer side of the recording-scheduled area portion; a reading process of reading the data pattern recorded by the control of the second controlling process, thereby obtaining a read signal; a measuring process of measuring jitter of the read signal; an adjusting process of adjusting the recording condition such that the jitter measured by the measuring process satisfies a desired condition; and a third controlling process of controlling the recording device to start the recording of the data pattern into the recording-scheduled area portion by using the optimum power and the recording condition adjusted by the adjusting process.

According to the embodiment of the recording method of the present invention, it is possible to receive the same various effects as those that can be received by the aforementioned embodiment of the recording apparatus of the present invention.

Incidentally, in response to the various aspects in the aforementioned embodiment of the recording apparatus of the present invention, the embodiment of the recording method of the present invention can also adopt various aspects.

(Embodiment of Computer Program)

An embodiment of the computer program of the present invention is a computer program for recording control and for controlling a computer provided in a recording apparatus provided with: a recording device for recording a desired data pattern onto a recording medium provided with an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device (i.e. the embodiment of the recording apparatus of the present invention described above (including its various aspects)), the computer program making the computer function as at least one portion of the recording device, the first calculating device, the first controlling device, the second calculating device, the second controlling device, the reading device, the measuring device, the adjusting device, and the third controlling device.

According to the embodiment of the computer program of the present invention, the aforementioned embodiment of the recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned embodiment of the recording apparatus of the present invention, the embodiment of the computer program of the present invention can also adopt various aspects.

An embodiment of the computer program product of the present invention is a computer program product in a computer-readable medium for tangibly embodying a program of instructions executable by a computer provided in a recording apparatus provided with: a recording device for recording a desired data pattern onto a recording medium provided with an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device (i.e. the embodiment of the recording apparatus of the present invention described above (including its various aspects)), the computer program product making the computer function as at least one portion of the recording device, the first calculating device, the first controlling device, the second calculating device, the second controlling device, the reading device, the measuring device, the adjusting device, and the third controlling device.

According to the embodiment of the computer program product of the present invention, the aforementioned embodiment of the recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the recording apparatus of the present invention.

Incidentally, in response to the various aspects in the aforementioned embodiment of the recording apparatus of the present invention, the embodiment of the computer program product of the present invention can also employ various aspects.

(Embodiment of Recording Medium)

A first embodiment of the recording medium of the present invention is a recording medium which is provided with an inner area and a user data area located on an outer side of the inner area and on which a data pattern is recorded by a recording apparatus provided with: a recording device for recording the desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

A second embodiment of the recording medium of the present invention is a recording medium provided with: an inner area; a user data area located on an outer side of the inner area; and a recording condition recording area to record therein a recording condition adjusted by a recording apparatus provided with: a recording device for recording a desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting the recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device. In this case, the recording condition is preferably recorded in association with identification information for identifying the information recording apparatus.

According to the embodiments of the recording medium of the present invention, the identification information about the recording apparatus and the recording condition are recorded on the recording medium. Thus, by reading the recording condition, which corresponds to the identification information about the recording apparatus, from the recording medium and by using it as the recording condition of the recording device when the data pattern is recorded by the recording apparatus, it is possible to receive the same various effects as those described above, in the recording operation performed on the recording medium, without adjusting the recording condition again.

Moreover, even if the recording condition is not recorded on the recording medium for the reason that the recording medium is blank or the like, in the embodiment, it is possible to preferably perform the recording compensation operation, as described above. Moreover, if the resulting recording condition is recorded on the recording medium in association with the identification information about the recording apparatus, it is possible to receive the same various effects as those described above, in the recording performed on the recording medium, without adjusting the recording condition again next time the data pattern is recorded.

In other words, according to this aspect without adjusting the recording condition by the adjusting device or with the recording condition adjusted at least once, it is possible to receive the same various effects as those described above, in the recording performed on the recording medium, without adjusting the recording condition on the corresponding recording apparatus again.

Incidentally, the recording condition may be recorded in advance on the recording medium, or it may be recorded along with the recording operation, as occasion demands.

Incidentally, in response to the various aspects in the aforementioned embodiment of the recording apparatus of the present invention, each of the embodiments of the recording medium of the present invention can also employ various aspects.

The operation and other advantages of the present invention will become more apparent from the examples explained below.

As explained above, according to the embodiment of the recording apparatus of the present invention, it is provided with the recording device, the first calculating device, the first controlling device, the second calculating device, the second controlling device, the reading device, the measuring device, the adjusting device, and the third controlling device. According to the embodiment of the recording method of the present invention, it is provided with the first calculating process, the first controlling process, the second calculating process, the second controlling process, the reading process, the measuring process, the adjusting process, and the third controlling process. According to the embodiment of the computer program of the present invention, it makes a computer function as the embodiment of the recording apparatus of the present invention. According to each of the embodiments of the recording medium of the present invention, it is provided with the recording condition recording area in which the data pattern is recorded by the aforementioned recording apparatus or which is to record therein the recording condition adjusted by the aforementioned adjusting device. Therefore, by performing the recording compensation operation in a more preferable aspect, it is possible to optimize the strategy, more preferably.

EXAMPLES

Hereinafter, examples of the present invention will be described with reference to the drawings.

(1) First Example

Firstly, with reference to FIG. 1 to FIG. 21, a first example of the recording apparatus of the present invention will be explained.

(1-1) Basic Structure

Firstly, with reference to FIG. 1, the basic structure of a recording apparatus in the first example will be described. FIG. 1 is a block diagram conceptually showing the basic structure of a recording apparatus 1 in the first example.

As shown in FIG. 1, the recording apparatus 1 in the first example is provided with a spindle motor 10, a pickup (PU) 11, a HPF (High Pass Filter) 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22.

The pickup 11 constitutes one specific example of the "recording device" and the "reading device" of the present invention. The pickup 11 photoelectrically converts reflected light when a laser beam LB is applied to a recording surface of an optical disc 100 rotated by the spindle motor 10, thereby generating a read signal $R_{RF}$. Moreover, the pickup 11 irradiates the recording surface of the optical disc 100 with the laser beam LB according to a recording strategy set on the recording strategy setting circuit 21, thereby recording a data pattern onto the optical disc 100.

The HPF 12 removes a low-frequency component of the read signal $R_{RF}$ outputted from the pickup 11, and it outputs a resulting read signal $R_{HC}$ to the A/D converter 13.

The A/D converter 13 samples the read signal $R_{RF}$ in accordance with a sampling clock outputted from a PLL (Phased Lock Loop) not illustrated or the like, and it outputs a resulting read sample value series RS to the pre-equalizer 14.

The pre-equalizer 14 removes intersymbol interference which is based on transmission characteristics in an information reading system which is formed of the pickup 11 and the optical disc 100, and it outputs a resulting read sample value series $RS_C$ to each of the binary circuit 16 and the delay circuit 18.

The binary circuit 16 performs a binary process on the read sample value series $RS_C$, and it outputs a resulting binary signal to each of the decoding circuit 17 and the pattern judgment circuit 19.

The decoding circuit 17 performs a decoding process or the like on the binary signal, and it outputs a resulting reproduction signal to external reproduction equipment such as a display and a speaker. As a result, data according to the data pattern recorded on the optical disc 100 (e.g. video data, audio data, and the like) is reproduced.

The delay circuit 18 applies a delay corresponding to a time required for the processes of the binary circuit 16 and the pattern judgment circuit 20 to the read sample value series $RS_C$, and then, it outputs the read sample value series $RS_C$ to the averaging circuit 19. In other words, by the operations of the delay circuit 18, each sample value in the read sample value series $RS_C$ outputted from the pre-equalizer 14 is inputted to the averaging circuit 19 in the same timing as the timing in which the data pattern judgment result of the sample value is inputted.

The averaging circuit 19 constitutes one specific example of the "measuring device" of the present invention. The averaging circuit 19 measures the jitter of the read sample value series $RS_C$. The details of the averaging circuit 19 will be detailed later (refer to FIG. 9).

The pattern judgment circuit 20 constitutes one specific example of the "detecting device" of the present invention. The pattern judgment circuit 20 judges the data pattern on the basis of the binary signal outputted from the binary circuit 16. Namely, it judges which data pattern the binary signal inputted to the pattern judgment circuit 20 is. The judgment result is outputted to the averaging circuit 19.

The recording strategy adjustment circuit 21 constitutes one specific example of the "adjusting device" of the present invention. The recording strategy adjustment circuit 21 adjusts the recording strategy of each data pattern on the basis of the jitter measured on the averaging circuit 19.

The CPU 22 constitutes one specific example of the "first controlling device", the "second controlling device", the "third controlling device", the "first calculating device", and the "second calculating device" of the present invention. The CPU 22 controls the aforementioned various constituents which constitute the recording apparatus 1, thereby controlling the operations of the recording apparatus 1 as a whole.

(1-2) Optical Disc

Next, with reference to FIG. 2, an explanation will be given on the basic structure of the optical disc 100 which is the target of the recording operation of the recording apparatus 1 in the first example. FIG. 2 is a schematic plan view showing the basic structure of the optical disc 100 and a schematic conceptual view showing a recording area structure in the radial direction of the optical disc 100.

As shown in FIG. 2, the optical disc 100 has a recording surface on a disc main body, for example, with a diameter of about 12 cm as in a DVD. On the recording surface, the optical disc 100 is provided with a center hole 101 as the center; an inner PCA (Power Calibration Area) 111 which constitutes one specific example of the "inner area" of the present invention; a RMA (Recording Management Area) 112; a lead-in area 118; a data recording area 114 which constitutes one specific example of the "user data area" of the present invention; a lead-out area 115; and an outer PCA 116. Moreover, for example, a groove track and a land track are alternatively provided, spirally or concentrically, centered on the center hole 101. Moreover, on the track, the data pattern is divided and recorded by a unit of ECC block. The ECC block is an error-correctable data management unit. Moreover, in the example, the optical disc 100 is preferably a recordable recording medium which can record the data pattern only once.

Then, the groove track is oscillated with a constant amplitude and at a constant spatial frequency. In other words, the groove track is wobbled, and the cycle of the wobble is set to a predetermined value. On the land track, a pit referred to as a land pre-pit (LPP) is formed which indicates a pre-format address. By virtue of the two addressing (i.e. the wobble and the land pre-pit), it is possible to perform disc rotation control during the recording and to generate a recording clock, as well as obtaining information required for the recording of the data pattern, such as a recording address. Incidentally, the pre-format address may be recorded in advance by modulating the wobble of the groove track by a predetermined modulation method, such as frequency modulation and phase modulation.

Incidentally, in the first example, the optical disc 100 preferably adopts a ZCLV (Zone Constant Linear Velocity) in which a linear velocity increases towards the outer side. However, it may adopt another method (e.g. CLV, CAV (Constant Angular Velocity), ZCAV, or the like).

Moreover, as detailed later with reference to FIG. 4 and FIG. 5, the lead-in area 113 of the aforementioned areas may be pre-recorded or may not be pre-recorded on the optical disc 100 in the first example.

If the lead-in area 113 is pre-recorded, a LRA (Last Recorded Address) which is the address of the end on the outermost side of the data recording area 114 may be pre-recorded in a CDZ (Control Data Zone) in the lead-in area 113. In other words, the size of the data recording area 114 may be also determined in advance. Moreover, the land pre-pit can also indicate the LRA. In this case, the LRA pre-recorded in the CDZ matches the LRA indicated by the land pre-pit.

On the other hand, if the lead-in area 113 is not pre-recorded, the size of the data recording area 114 may not be determined in advance. In this case, after the data pattern is recorded into the data recording area 114, the address of the end on the outermost side of an area portion of the data recording area 114 in which the data pattern according to the data to be recorded is recorded is recorded into the CDZ as the LRA. Moreover, the lead-out area 115 is formed to expand to the outer side from the end on the outermost side of the area portion in which the data pattern is recorded of the data recording area 114. On the other hand, even if the lead-in area 113 is not pre-recorded, the land pre-pit indicates the LRA which is the address of the end on the outermost side of the data recording area 114 which is default in advance. In this case, the LRA recorded in the CDZ may not match the LRA indicated by the land pre-pit sometimes.

As described above, the position of the end on the outermost side of the data recording area 114 can vary depending on whether or not the lead-in area 113 is pre-recorded. In the first example, the explanation will be given in the condition that an area portion from the end on the outermost side of the lead-in area 113 to the position indicated by the LRA indicated by the land pre-pit corresponds to one specific example of the "user data area" of the present invention. In other words, the explanation will be given in the condition that the area portion from the end on the outermost side of the lead-in area 113 to the position indicated by the LRA indicated by the land pre-pit corresponds to the data recording area 114.

Of course, regardless of whether or not the lead-in area 113 is pre-recorded, it is obvious that effects described later can be obtained by performing operations described later in the case of the optical disc 100 having the aforementioned area structure.

(1-3) Operation Example

Next, with reference to FIG. 3, an explanation will be given on an operation example of the recording apparatus 1 in the first example (particularly, a recording compensation operation). FIG. 3 is a flowchart conceptually showing a flow of operations of the recording apparatus 1 in the first example.

Firstly, before the data pattern is recorded into the data recording area 114 (or before the recording is performed for the first time at a certain linear velocity), by the operation of the CPU 22, it is judged whether or not the currently applied linear velocity is a linear velocity which allows the data pattern for performing the recording compensation operation to be recorded in the inner PCA 111 (step S101).

As a result of the judgment in the step S101, if it is judged that the currently applied linear velocity is the linear velocity which allows the data pattern for performing the recording compensation operation to be recorded in the inner PCA 111 (the step S101: Yes), the inner PCA 111 is set to an area portion for performing the recording compensation operation (i.e. a recording compensation area) by the operation of the CPU 22 (step S102). Then, OPC is performed in the inner PCA 111 or the outer PCA 116 (step S103). Then, the data pattern is recorded into the recording compensation area set in the step S102 by using the laser beam with the optimum power calculated by the OPC in the step S103, thereby performing the recording compensation operation (step S109). Incidentally, the recording compensation operation will be detailed later, with reference to FIG. 9.

On the other hand, as a result of the judgment in the step S101, if it is judged that the currently applied linear velocity is not the linear velocity which allows the data pattern for performing the recording compensation operation to be recorded in the inner PCA 111 (the step S101: No), then, an area portion required to record the data pattern which is scheduled to be recorded is calculated by the operation of the CPU 22 (step S104). In other words, the size of the data pattern which is scheduled to be recorded is calculated. That is, the area portion in which the data pattern is scheduled to be recorded is identified from the data recording area 114.

Then, by the operation of the CPU 22, it is judged whether or not there is an area portion in which the data pattern is not recorded in the data recording area 114, on the basis of the calculation result in the step S104 (step S105).

As a result of the judgment in the step S105, if it is judged that there is the area portion in which the data pattern is not recorded in the data recording area 114 (the step S105: Yes), an area portion of the data recording area 114 in which the data pattern is not scheduled to be recorded is set to the area portion for performing the recording compensation operation (step S106). In other words, the area portion of the data recording area 114 which is located outer than the end on the outer side of the area portion (i.e. a recording-scheduled area portion) in which the data pattern is scheduled to be recorded and which exists in the data recording area 114 is set to the area portion for performing the recording compensation operation.

On the other hand, as a result of the judgment in the step S105, if it is judged that there is not the area portion in which the data pattern is not recorded in the data recording area 114 (the step S105: No), the area portion outer than the data recording area 114 is set to the area portion for performing the recording compensation operation by the operation of the CPU 22 (step S106).

Here, with reference to FIG. 4 and FIG. 6, the operation of setting the area portion for performing the recording compensation operation in the step S106 and the step S107 in FIG. 3 will be explained in more detail. FIG. 4 are area structure diagrams conceptually showing an example of setting the area portion for performing the recording compensation operation targeted at the optical disc 100 in which the lead-in area 113 is pre-recorded. FIG. 5 are area structure diagrams conceptually showing an example of setting the area portion for performing the recording compensation operation targeted at the optical disc 100 in which the lead-in area 113 is not pre-recorded.

As shown in FIG. 4(*a*), in the optical disc 100 in which the lead-in area 113 is pre-recorded, if there is the area portion in which the data pattern according to the data to be recorded is not recorded in the data recording area 114, the area portion of the data recording area 114 in which the data pattern according to the data to be recorded is not scheduled to be recorded is set to the area portion for performing the recording compensation operation. In other words, the area portion (more specifically, its one portion) which is located outer than the end on the outer side of the area portion in which the data pattern according to the data to be recorded is recorded and which is located inner than the area portion indicated by the LRA pre-recorded in the CDZ is set to the area portion for performing the recording compensation operation.

As shown in FIG. 4(*b*), in the optical disc 100 in which the lead-in area 113 is pre-recorded, if there is not the area portion in which the data pattern according to the data to be recorded is not recorded in the data recording area 114, the area portion located outer than the data recording area 114 is set to the area portion for performing the recording compensation operation. In other words, the area portion (more specifically, its one portion) which is located outer than the area portion indicated by the LRA pre-recorded in the CDZ is set to the area portion for performing the recording compensation operation.

As shown in FIG. 5(*a*), in the optical disc 100 in which the lead-in area 113 is not pre-recorded, if there is the area portion in which the data pattern according to the data to be recorded is not recorded in the data recording area 114, the area portion of the data recording area 114 in which the data pattern according to the data to be recorded is not scheduled to be recorded is set to the area portion for performing the recording compensation operation. In other words, the area portion (more specifically, its one portion) which is located outer than the end on the outer side of the area portion in which the data pattern according to the data to be recorded is recorded and which is located inner than the area portion indicated by the LRA indicated by the land pre-pit (i.e. the LRA assigned to the land pre-pit) is set to the area portion for performing the recording compensation operation. In this case, the area portion of the data recording area 114 in which the data pattern according to the data to be recorded is not scheduled to be recorded is originally padded by using a padding data pattern with a lead-out area attribute (e.g. 00h data pattern) or the like, and it is treated as the lead-out area 115 for a reproducing apparatus. In the first example, only the area portion of the data recording area 114 in which the data pattern according to the data to be recorded is not scheduled to be recorded and which is not used for the recording compensation operation is padded by using the padding data pattern with the lead-out area attribute.

As shown in FIG. 5(*b*), in the optical disc 100 in which the lead-in area 118 is not pre-recorded, if there is not the area portion in which the data pattern according to the data to be recorded is not recorded in the data recording area 114, the area portion which is located outer than the data recording area 114 (more specifically, its one portion) is set to the area portion for performing the recording compensation operation. In other words, the area portion which is located outer than the area portion indicated by the LRA indicated by the land pre-pit is set to the area portion for performing the recording compensation operation.

Incidentally, in setting the area portion for performing the recording compensation operation in the data recording area 114, the recording compensation operation is preferably set in view of a positional relation with the end on the outer side of the area portion in which the data pattern according to the data to be recorded is recorded. Such a setting operation will be explained in more detail with reference to FIG. 6. FIG. 6 are area structure diagrams conceptually showing another example of setting the area portion for performing the recording compensation operation.

As shown in FIG. 6(a), the area portion for performing the recording compensation operation is preferably set to be relatively close to the end on the outer side of the area portion in which the data pattern according to the data to be recorded is recorded. In other words, the area portion for performing the recording compensation operation is preferably set to be closer to the end on the outer side of the area portion in which the data pattern according to the data to be recorded is recorded, than to the end on the outer side of the data recording area 114 pre-recorded in the CDZ or indicated by the LEA indicated by the land pre-pit.

Alternatively, as shown in FIG. 6(b), the area portion for performing the recording compensation operation is preferably set to adjacent to the end on the outer side of the area portion in which the data pattern according to the data to be recorded is recorded.

However, as shown in FIG. 6(b), the area portion for performing the recording compensation operation is preferably set to be provided with an empty space of a predetermined size (e.g. about IECC block to several ECC blocks) between the area portion for the recording compensation operation and the end on the outer side of the area portion in which the data pattern according to the data to be recorded is recorded.

In FIG. 3 again, then, the power of the laser beam LB for performing the recording compensation operation is calculated (step S108).

Now, with reference to FIG. 7, an explanation will be given on the operation of calculating the power of the laser beam LB for performing the recording compensation operation. FIG. 7 is a flowchart conceptually showing a flow of the operation of calculating the power of the laser beam LB for performing the recording compensation operation.

As shown in FIG. 7, firstly, under the control of the CPU 22, an AOPC operation is performed in the inner PCA 111 (step S301). By this, the optimum power used in recording the data pattern according to the data to be recorded into the recording-scheduled area portion is calculated.

Incidentally, the AOPC operation is an operation of calculating the optimum power of the laser beam LB at a linear velocity which cannot be realized in the inner PCA 111 or the outer PCA 116 (e.g. a linear velocity corresponding to a recording speed of 8x) by the OPC operation in the inner PCA 111 or the outer PCA 116, in consideration of a difference in the properties of the recording surface of the optical disc 100 (e.g. a difference in recording sensitivity on the inner side, on the middle side, and on the outer side), a difference in the linear velocity, or the like. In other words, it is a special OPC operation to dissolve such a disadvantage that the OPC is performed in the inner PCA 111 in which only a relatively low linear velocity can be realized while the linear velocity increases towards the outer side of the optical disc 100. According to the AOPC, the recording properties throughout the entire surface of the optical disc 100 can be substantially estimated on the basis of the result of the OPC performed in the inner PCA 111. Here, considering that the linear velocity increases towards the outer side of the optical disc 100, it is possible to substantially estimate the recording properties corresponding to the linear velocity which can be realized on the optical disc 100, by associating the radial position of the optical disc 100 with the linear velocity. As a result, it is possible to estimate the optimum power used in recording the data pattern into an arbitrary area portion of the optical disc 100 (in other words, in recording the data pattern at an arbitrary linear velocity). Please refer to International Publication WO2005/043515 pamphlet for the details.

However, not only the AOPC but also an operation of calculating the optimum power of the laser beam LB at the linear velocity which cannot be realized in the inner PCA 111 or the outer PCA 116 (e.g. the linear velocity corresponding to a recording speed of 8x) by the OPC operation or other calculations in the inner PCA 111 or the outer PCA 116 can be adopted as the operation in the step S108. For example, the OPC may be performed in each of the inner PCA 111 and the outer PCA 116, and from the results of the OPC performed in the two PCAs, the optimum power used in recording the data pattern into an area portion located between the two PCAs may be calculated by an interpolation process or the like.

Then, under the control of the CPU 22, the data pattern is recorded into the recording compensation area with the optimum power calculated by the AOPC in the step S201 (step S302). Then, the recorded data pattern is read, and the recording properties (e.g. jitter, asymmetry or the like) are measured.

Then, under the control of the CPU 22, a difference between a recording sensitivity in the recording-scheduled area portion and a recording sensitivity in the recording compensation area is calculated (step S303). Specifically, the result of the AOPC in the step S301 directly or indirectly indicates the recording sensitivity in the recording-scheduled area portion, and the result of the recording of the data pattern in the step S302 directly or indirectly indicates the recording sensitivity in the recording compensation area. Thus, by comparing the result in the step S301 with the result in the step S302, it is possible to calculate the difference between the recording sensitivity in the recording-scheduled area portion and the recording sensitivity in the recording compensation area. Here, the difference between the recording sensitivity in the recording-scheduled area portion and the recording sensitivity in the recording compensation area may be directly calculated. Alternatively, considering that the difference between the recording sensitivity in the recording-scheduled area portion and the recording sensitivity in the recording compensation area is indirectly indicated by a difference between recording properties in the recording-scheduled area portion and recording properties in the recording compensation area, the difference between the recording sensitivity in the recording-scheduled area portion and the recording sensitivity in the recording compensation area may be indirectly calculated by calculating the difference between the recording properties in the recording-scheduled area portion and the recording properties in the recording compensation area.

Then, under the control of the CPU 22, the power of the laser beam LB for performing the recording compensation operation used in performing the recording compensation operation in the recording compensation operation is calculated on the basis of the difference between the recording sensitivity in the recording-scheduled area portion and the recording sensitivity in the recording compensation area (step S304).

Now, with reference to FIG. 8, a more detailed explanation will be given on the operation of calculating the power of the laser beam LB used in performing the recording compensation operation in the recording compensation operation (i.e. the power of the laser beam LB for performing the recording compensation operation). FIG. 8 are graphs conceptually showing the recording properties in the area portion (or the recording-scheduled area portion) in which the data pattern according to the data to be recorded is scheduled to be recorded of the data recording area 114 and the recording properties in the area portion (or the recording compensation area) in which the recording compensation operation is performed. Incidentally, in FIG. 8, the explanation will be given in the assumption that a "middle circumference" corresponds to the recording-scheduled area portion, and an "outer circumference" corresponds to the recording compensation area.

FIG. 8(a) shows a graph showing a correlation of jitter vs. power in each of the middle circumference and the outer circumference of the general optical disc 100. As shown in FIG. 8(a), the middle circumference and the outer circumference have different optimum powers (in other words, powers with the smallest jitter) due to a difference between a recording sensitivity in the middle circumference and a recording sensitivity in the outer circumference. Specifically, the optimum power in the middle circumference is 30 mW, whereas the optimum power in the outer circumference is 31.5 mW. Thus, it is considered that an optimum recording condition (i.e. recording strategy) is not necessarily obtained even if the recording compensation operation is performed in the recording compensation area (i.e. the outer circumference in FIG. 8(a)) with the optimum power obtained by the AOPC (i.e. the optimum power in the middle circumference in FIG. 8(a)).

Here, according to a graph in FIG. 8(b) indicating a correlation of jitter vs. asymmetry in each of the middle circumference and the outer circumference of the general optical disc 100, it is seen that the jitter improved if the asymmetry is uniformed in each of the middle circumference and the outer circumference (e.g. if it is set to approximately 0), regardless of whether or not the recording is performed in the middle circumference or the outer circumference. In the first example, the power for compensation is calculated by effectively using such a characteristic. Specifically, the power which realizes the same asymmetry in the outer circumference (or the recording compensation area) as the asymmetry with the optimum power in the middle circumference (or the recording-scheduled area portion) is calculated as a power for performing the recording compensation operation.

Specifically, by reading the data pattern recorded by the operation in the step S302, as shown in FIG. 8(c), a correlation of power vs. asymmetry in the outer circumference (or the recording compensation area) is obtained. Now, it is assumed that the optimum power in the middle circumference (the optimum power obtained by the AOPC) is 30 mW which allows an asymmetry of 0. In this case, with the same power, the asymmetry changes to −0.05 in the outer circumference (or the recording compensation area). Thus, according to the difference between the recording sensitivity in the inner circumference (or the recording-scheduled area portion) and the recording sensitivity in the outer circumference (or the recording compensation area), 31.4 mW which is a power which realizes the same asymmetry of 0 in the outer circumference (or the recording compensation area) as the asymmetry with the optimum power in the middle circumference (or the recording-scheduled area portion) is set as the power for performing the recording compensation operation.

In FIG. 3 again, then, the recording compensation operation is performed (the step S109). More specifically, if it is judged to be Yes in the step S101, the recording compensation operation is performed in the recording compensation area set in the step S102 by using the laser beam LB with the power calculated by the OPC in the step S103. On the other hand, if it is judged to be No in the step S101 and if it is judged to be Yes in the step S105, the recording compensation operation is performed in the recording compensation area set in the step S106 by using the laser beam LB with the power calculated in the step S108. On the other hand, if it is judged to be No in the step S101 and if it is judged to be No in the step S105, the recording compensation operation is performed in the recording compensation area set in the step S107 by using the laser beam LB with the power calculated in the step S108.

After the recording compensation operation, the recording is started at the set linear velocity, under the control of the CPU 22 (step S110). In other words, the recording of the data pattern is started by applying the laser beam LB with the optimum power calculated in the step S103 or the step S301 in FIG. 7 and in the optimum recording condition (optimum strategy) set in the step S109. Then, by the operation of the CPU 22, it is judged whether or not the recording operation is to be ended (step S111).

As a result of the judgment in the step S111, if it is judged that the recording operation is to be ended (the step S111: Yes), the recording operation is ended.

On the other hand, as a result of the judgment in the step S111, if it is judged that the recording operation is not to be ended (the step S111: No), then, it is judged whether or not the linear velocity is to be changed by the operation of the CPU 22 (step S112).

As a result of the judgment in the step S112, if it is judged that the linear velocity is to be changed (the step S112: Yes), the operational flow returns to the step S101, and the operations after the step S101 are repeated.

On the other hand, as a result of the judgment in the step S112, if it is judged that the linear velocity is not to be changed (the step S112: No), the operational flow returns to the step S111, and the recording operation is continued.

Next, with reference to FIG. 9, the recording compensation operation in the step S109 in FIG. 3 will be explained in more detail. FIG. 9 is a flowchart conceptually showing a flow of the recording compensation operation in the step S109 in FIG. 3.

As shown in FIG. 9, firstly, under the control of the CPU 22, the data pattern is recorded into the area portion, which is set in the step S102, the step S106, or the step S107 in FIG. 3, for performing the recording compensation operation (step S201). The data pattern recorded here is the data pattern for performing the recording compensation operation but not a special data pattern like the OPC pattern, and it is the same data pattern as a normal data pattern recorded in the data recording area 114. Then, the jitter is measured by the operation of the averaging circuit 19 (step S202).

Now, with reference to FIG. 10 and FIG. 11, an explanation will be given on the operation in measuring the jitter and the averaging circuit 19 for measuring the jitter. FIG. 10 is a waveform diagram conceptually showing an operation of measuring the jitter by the averaging circuit 19, on the read sample value series $RS_C$. FIG. 11 is a block diagram conceptually showing the basic structure of the averaging circuit 19.

As shown in FIG. 10, in the first example, the averaging circuit 19 firstly measures a difference (i.e. an edge shift in an amplitude direction) between a zero level and a sample value (which is shown by a black circle in FIG. 10 and which will be hereinafter referred to as a "zero cross sample value" as occasion demands) in the vicinity of the zero cross point of the read sample value series $RS_C$, for each data pattern, in order to measure the jitter. If there is no intersymbol interference in the read signal $R_{RF}$, the sample value that approximately matches the zero level in the timing of a clock CLK becomes the zero cross sample value. If there is the intersymbol interference in the read signal $R_{RF}$, the sample value that is the closest to the zero level in the timing of the clock CLK is the zero cross sample value.

In order to perform such an operation, the averaging circuit 19 is provided with a trigger generation device 1911, a total jitter measurement block 191, n individual shift jitter component measurement blocks 192-1 to 192-n, and a whole shift jitter component measurement circuit 193, as shown in FIG. 11. The number of the individual shift jitter component measurement blocks 192-1 to 192-n is equal to the combination number of types of the data patterns. In other words, if the optical disc 100 is a DVD, there are 10 types of data run lengths (3T to 11T, and 14T). For each mark length, an individual shift jitter can be classified by using the combination pattern of front and rear space lengths. For example, there are 100 combinations of the front space length and each mark length, and there are 100 combinations of the rear space length and each mark: n=200 in total. In view of an effective pupil diameter and the data run length, the same intersymbol interference occurs in the combination patterns of the marks/spaces of 6T or more. Thus, if the data of 6T or more are treated as the same group, n can be reduced to n=32. If the optical disc 100 is a Blu-ray Disc, there are 8 types of data run lengths (2T to 9T), so that the combination patterns of the front and rear space lengths for each mark length is n=8*8*2=128 combinations. As in the DVD, in view of the effective pupil diameter and the data run length, if the data of 5T or more are treated as the same group, n can be reduced to n=82. Moreover, each of the individual shift jitter component measurement blocks 192-1 to 192-n measures corresponding one of the individual shift jitter components in the data patterns.

The read sample value series $RS_C$ outputted from the delay circuit 18 is inputted to an ABS circuit 1912 and n adders 1923-1 to 1923-n. Moreover, the pattern judgment result outputted from the pattern judgment circuit 20 is inputted to the trigger generation device 1911.

The trigger generation device 1911 generates a trigger signal which is distinguished in each data pattern and which is at high level (or low level) in timing in which the data pattern is inputted, in accordance with the pattern judgment result outputted from the pattern judgment circuit 20. The trigger signal is inputted to an OR circuit 1917, n sample hold (S/H) circuits 1924-1 to 1924-n, and n counters 1925-1 to 1925-n.

Next, the operation of the total jitter measurement block 191 will be explained. The absolute value of the zero cross sample value outputted from the ABS circuit 1912 is added on an adder 1913. The addition result is sample-held in timing in which any trigger signal is at high level (or low level) (i.e. in timing in which any data pattern is inputted to the total jitter measurement block 191), on a sample-holding circuit 1914. The result is outputted to a divider 1916 and is fed back to the adder 1913. Thus, a sum of the absolute values of the zero cross sample values of all the data patterns is outputted to the divider 1918. On the other hand, a counter 1915 counts the number of times that the trigger signal is at high level (or low level) (i.e. the number of the data patterns inputted to the total jitter measurement block 191). The count result is outputted to the divider 1916. The divider 1916 divides the sum of the absolute values of the zero cross sample values by the number of the data patterns inputted. As a result, an average value of the absolute values of the zero cross sample values is outputted. In the example, the average value of the absolute values of the zero cross sample values is a total jitter (i.e. jitter as a whole, which is obtained in consideration of a random jitter component and a shift jitter component).

Next, the operation of the individual shift jitter component measurement blocks 192-1 to 192-n will be explained. Here, an explanation will be given on the operation of the individual shift jitter component measurement block 192-1 which corresponds to the zero cross sample value of the data pattern of a 3T mark in the rear of a space with a run length of 3T when the optical disc 100 is a DVD. By the actions of the adder 1923-1 and the sample-holding circuit 1924-1, in timing in which the trigger signal corresponding to the data pattern of the 3T mark in the rear of the space with a run length of 3T is at high level (or low level) (i.e. in timing in which a boundary zero cross sample of the 3T mark in the rear of the 3T space is inputted to the individual shift jitter component measurement block 192-1), the boundary zero cross sample of the 3T mark in the rear of the 3T space is sample-held. The result is outputted to a divider 1926-1 and is fed back to the adder 1923-1. In other words, on the adder 1923-1, only the boundary zero cross sample value of the 3T mark in the rear of the 3T space is integrated, and a sum of the boundary zero cross sample values of the 3T mark in the rear of the 3T space is outputted to the divider 1926-1. On the other hand, a counter 1925-1 counts the number of times N(1) that the trigger signal is at high level (or low level) (i.e. the number of the boundary zero cross samples of the 3T mark in the rear of the 3T space inputted to the individual shift jitter component measurement block 192-1). The count result is outputted to the divider 1926-1. The divider 1926-1 divides the sum of the boundary zero cross sample values of the 3T mark in the rear of the 3T space by the inputted N(1). As a result, an average value S(1) of the boundary zero cross sample values of the 3T mark in the rear of the 3T space is outputted. This operation is performed for each corresponding data pattern, on the other individual shift jitter component measurement blocks 192-2 to 192-n. In the example, the average values of the zero cross sample values in the respective data patterns are individual shift jitter components S(1) to S(n).

The individual shift jitter components S(1) to S(n) in the respective data patterns are also outputted to the whole shift jitter component measurement circuit 193. Moreover, the number of times N(1) to N(n) that the trigger signal is at high level are also outputted to the whole shift jitter component measurement circuit 193. On the whole shift jitter component measurement circuit 193, a shift jitter component as a whole obtained in consideration of the occurrence probability of the individual shift jitter components in the respective data patterns is outputted by performing an arithmetic operation shown in an Equation 1.

$$\sqrt{\sum_{i=1}^{n} S(i)^2 \frac{N(i)}{\sum_{j=1}^{n} N(j)}} \quad \text{[Equation 1]}$$

In FIG. 9 again, then, under the control of the CPU 22, it is judged whether or not the individual shift jitter components of the jitter measured in the step S202 are less than a first threshold value (step S203). The judgment is performed in each data pattern. In other words, the judgment is performed on each of the individual shift jitter components measured on the individual shift jitter component measurement blocks 192-1 to 192-n. Specifically, if the optical disc 100 is a DVD and 6T or more are treated as the same group, the judgment in the data pattern of a front space with a run length of 3T, the judgment in the data pattern of a front space with a run length of 4T, the judgment in the data pattern of a front space with a run length of 5T, and the judgment in the data pattern of a front space of a run length of 6T are performed with respect to the 3T mark. In the same manner, the judgments in the data patterns of the front spaces with run lengths of 3T, 4T, 5T, and 6T or more are performed with respect to marks with 4T or more. The judgments in the data patterns of rear spaces with run lengths of 3T, 4T, 5T, and 6T or more are performed with respect to marks with 3T, 4T, 5T, and 6T or more. Although 6T or more are treated as the unified group, if the recording compensation is performed with respect to an influence of coma aberration or the like by a tangential tilt, it is possible to treat the influenced data pattern, or individually treat 3T to 11T and 14T. On the other hand, if the optical disc 100 is a Blu-ray Disc and 5T or more are treated as the same group, the judgment in the data patterns of front spaces or rear spaces with 2T, 3T, 4T, and 5T or more is performed with respect to marks with 2T, 3T, 4T, and 5T or more. Although 5T or more are treated as the unified group, as in the DVD, if the recording compensation is performed with respect to the influence of coma aberration or the like by the tangential tilt, it is possible to treat the influenced data pattern, or individually treat 2T to 9T.

Incidentally, a value common to all the data patterns may be used as the first threshold value or an individual value for each data pattern (or each group including a plurality of data patterns) may be used as the first threshold value. Moreover, the specific value of the first threshold value is preferably set to realize that a ratio of the random jitter component to the jitter is greater than or equal to a predetermined value (e.g. approximately 80% as described later). Incidentally, the recording compensation operation may be performed such that the ratio of the random jitter component to the total jitter is greater than or equal to approximately 80%. However, in order to further reduce the total jitter, the recording compensation operation may be performed such that the ratio of the random jitter component to the total jitter is greater than or equal to approximately 90%.

As a result of the judgment in the step S203, if it is judged that the shift jitter components in at least one or all of the data patterns are less than the first threshold value (the step S203: Yes), the operation is ended.

On the other hand, as a result of the judgment in the step S203, if it is judged that the shift jitter components in at least one or all of the data patterns are not less than the first threshold value (the step S203: No), the operation of adjusting the strategy, which is the recording compensation operation, is performed (step S204).

Here, the recording compensation may be performed on the data pattern corresponding to the shift jitter component that is judged not to be less than the first threshold value. Alternatively, in addition to the data pattern corresponding to the shift jitter component that is judged not to be less than the first threshold value, the recording compensation may be performed on the data pattern corresponding to the shift jitter component that is judged to be less than the first threshold value.

Here, with reference to FIG. 12, the recording compensation operation in the step S204 in FIG. 9 will be explained. FIG. 12 is a graph conceptually showing the states of the shift jitter components in the respective data patterns and the shift jitter component as a whole before recording compensation and the states of the shift jitter components in the respective data patterns and the shift jitter component as a whole after the recording compensation. The average value of a distribution in each data pattern is the individual shift jitter component.

As shown in FIG. 12, in the first example, such a recording compensation operation is performed that the variations of each of the individual shift jitter components in the respective data patterns is reduced or eliminated. More specifically, if the jitter distributions in the respective data patterns have variations on the basis of the rising point of the clock shown by a longitudinal arrow as shown on the left side of FIG. 12, the recording compensation operation is performed such that the jitter distributions in the respective data patterns are shifted to the rising point of the clock as shown on the right side of FIG. 12. In other words, the recording compensation operation is performed such that the jitter distributions in the respective data patterns match at or in the vicinity or the rising point of the clock. In other words, the recording compensation operation is performed such that the jitter distributions in the respective data patterns are equal. As a result, the jitter distribution as a whole (i.e. total jitter distribution) is a normal distribution centered on the rising position of the clock or the like. Namely, in the recording compensation operation in the example, instead of reducing the widths of the jitter distributions in the respective data patterns (in other words, instead of reducing the random jitter component), the average values of the jitter distributions in the respective data patterns are matched. This corresponds to an operation of reducing the individual shift jitter components in the respective data patterns.

In order to reduce the individual shift jitter components in the respective data patterns, the recording strategy adjustment circuit 21 adjusts the recording strategy, for example, as shown in FIG. 13 to FIG. 15. FIG. 13 is a timing chart conceptually showing a first aspect of the recording strategy adjustment operation. FIG. 14 is a timing chart conceptually showing a second aspect of the recording strategy adjustment operation. FIG. 15 is a timing chart conceptually showing a third aspect of the recording strategy adjustment operation.

For example, as shown in FIG. 13, the pulse width of a recording pulse (i.e. recording strategy) which defines the waveform of the laser beam for recording the data pattern (record data) may be adjusted.

Moreover, as shown in FIG. 14, the amplitudes (e.g. a top pulse amplitude Po, a middle pulse amplitude Pm, a bias power amplitude Pb) of the recording pulse (i.e. recording strategy) which define the waveform of the laser beam for recording the data pattern (record data) may be adjusted. Here, as shown in the recording pulse on the top in FIG. 14, the amplitudes of the recording pulse corresponding to the data patterns with run lengths of 3T and 4T and the amplitudes of the recording pulse corresponding to the data patterns with run lengths of 5T or more may be separately adjusted. Alternatively, as shown in the second recording pulse from the top in FIG. 14, the amplitudes of the recording pulse corresponding to the data pattern with a run length of 3T, the amplitudes of the recording pulse corresponding to the data pattern with a run length of 4T, the amplitudes of the recording pulse corresponding to the data pattern with a run length of 5T, and the amplitudes of the recording pulse corresponding to the data pattern with run lengths of 6T or more may be separately adjusted. Alternatively, as shown in the third recording pulse from the top in FIG. 14, the amplitudes of the recording pulse corresponding to the data pattern with a run length of 3T, the amplitudes of the recording pulse corresponding to the data pattern with a run length of 4T, and the amplitudes of the recording pulse corresponding to the data pattern with run lengths of 5T or more may be separately adjusted. Alternatively, as shown in the fourth recording pulse from the top in FIG. 14, the amplitudes of the recording pulse corresponding to the data pattern with a run length of 3T and the amplitudes of the recording pulse corresponding to the data pattern with run lengths of 4T or more may be separately adjusted.

Moreover, as shown in FIG. 15, even if the recording pulse is not of a castle type, as in the case shown in FIG. 14, the amplitudes of the recording pulse (i.e. the recording strategy) which define the waveform of the laser beam for recording the data pattern (or record data) may be adjusted.

Of course, it is obvious that the recording strategy may be adjusted by combining the adjustment of the pulse width of the recording pulse as shown in FIG. 13 and the adjustment of the amplitudes of the recording pulse as shown in FIG. 14 and FIG. 15, as occasion demands.

As explained above, according to the recording apparatus 1 in the example, it is possible to reduce the total jitter by performing the recording compensation operation. Now, with reference to FIG. 16, the reduction effect of the total jitter will be explained. FIG. 16 is a graph conceptually showing total jitter of the data patterns recorded without performing the recording compensation operation and total jitter of the data pattern recorded after the recording compensation operation is performed in an aspect associated with the first example.

As shown in the upper part of FIG. 16, the total jitter varies widely on the recording apparatus which does not perform the recording compensation operation. On the other hand, on the recording apparatus which performs the recording compensation operation, the total jitter is reduced, and there axe small variations or little variation in the total jitter in comparison with the recording apparatus which does not perform the recording compensation operation.

In particular, in the first example, before the recording compensation operation is performed (in other words, the data pattern for adjusting the recording condition is recorded), the power for performing the recording compensation operation is calculated in consideration of the difference between the recording sensitivity in the recording-scheduled area portion and the recording sensitivity in the recording compensation operation area.

Now, with reference to FIG. 17 and FIG. 18, an explanation will be given on the recording property if the recording compensation operation is performed after calculating the power for performing the recording compensation operation in consideration of the difference in recording sensitivity and the recording property if the recording compensation operation is performed after calculating the optimum power calculated by the OPC without consideration of the difference in recording sensitivity. FIG. 17 is a graph conceptually showing the recording property in the case where the recording compensation operation is performed after calculating the optimum power calculated by the OPC without consideration of the difference in recording sensitivity. FIG. 18 is a graph conceptually showing the recording property in the case where the recording compensation operation is performed after calculating the power for performing the recording compensation operation in consideration of the difference in recording sensitivity.

In the graph in FIG. 17, the graph indicated by "without recording compensation" indicates the recording property in the case where the data pattern is recorded into the middle circumference (or the recording-scheduled area portion) without performing the recording compensation. The graph indicated by "with recording compensation" indicates the recording property in the case where the data pattern is recorded into the middle circumference (or the recording-scheduled area portion) after performing the recording compensation in the middle circumference (or the recording-scheduled area portion). The graph indicated by "with recording compensation (outer circumference)" indicates the recording property in the case where the data pattern is recorded into the middle circumference (or the recording-scheduled area portion) after performing the recording compensation in the outer circumference (or the recording compensation area) without consideration of the difference in recording sensitivity. As shown in FIG. 17, if the data pattern is recorded into the middle circumference (or the recording-scheduled area portion) after performing the recording compensation in the outer circumference (or the recording compensation area) without consideration of the difference in recording sensitivity, the recording property (or jitter) obtained with the optimum power (i.e. a power of 30 mW) deteriorates in the middle circumference (or the recording-scheduled area portion).

In the graph in FIG. 18, the graph indicated by "without recording compensation" indicates the recording property in the case where the data pattern is recorded into the middle circumference (or the recording-scheduled area portion) without performing the recording compensation. The graph indicated by "with recording compensation" indicates the recording property in the case where the data pattern is recorded into the middle circumference (or the recording-scheduled area portion) after performing the recording compensation in the middle circumference (or the recording-scheduled area portion). The graph indicated by "with recording compensation (outer circumference)" indicates the recording property in the case where the data pattern is recorded into the middle circumference (or the recording-scheduled area portion) after performing the recording compensation in the outer circumference (or the recording compensation area) in consideration of the difference in recording sensitivity. As shown in FIG. 18, if the data pattern is recorded into the middle circumference (or the recording-scheduled area portion) after performing the recording compensation in the outer circumference (or the recording compensation area) in consideration of the difference in recording sensitivity, it can be seen that the recording property (or jitter) obtained with the optimum power (i.e. a power of 30 mW) does not deteriorate in the middle circumference (or the recording-scheduled area portion).

In summary, if the recording compensation operation is performed in the recording compensation area which is outer than the recording-scheduled area portion by using the optimum power which is optimal in the recording-scheduled area portion without consideration of the difference in recording sensitivity, the optimum power in the recording-scheduled area portion is not necessarily optimal even in the recording compensation area. Thus, the recording compensation operation is likely performed with the power which is not optimal in the recording compensation operation. This is not preferable from the viewpoint of preferable adjustment of the recording condition. In the first example, however, the power of the laser beam LB for performing the recording compensation operation is calculated in consideration of the difference in recording sensitivity, so that the recording compensation operation is performed with the optimum power in the recording compensation area. On the other hand, when the data pattern is actually recorded into the recording-scheduled area portion, the optimum power in the recording-scheduled area is used, so that the data pattern can be preferably recorded in the recording-scheduled area portion. In other words, the data pattern can be recorded without deteriorating the recording quality of the data pattern.

In addition, the recording compensation operation can be performed in an area portion closer to the area portion in the data recording area 114 in which the data pattern is actually recorded in comparison with the innermost PCA 111 or the outermost PCA 116. Thus, the properties of the area portion in which the recording compensation operation is performed are no longer far removed from the properties of the area portion in which the data pattern is actually recorded. This increases the possibility that the strategy optimized by the recording compensation operation is preferable or optimal in the data recording area 114 in which the data pattern is actually recorded, in comparison with a case where the recording compensation operation is performed in the innermost PCA 111 or the outermost PCA 116. In other words, by performing the recording compensation operation in a more preferable aspect, it is possible to optimize the strategy, more preferably. Therefore, the data pattern can be recorded into the data recording area 114, more preferably, by using the strategy optimized by the recording compensation operation.

Now, an influence of a change in the properties on the recording surface of the optical disc 100 with respect to the jitter or the like will be explained with reference to FIG. 19 to FIG. 21. FIG. 19 a graph in which the jitter and asymmetry are associated with the radial position of the optical disc 100. FIG. 20 are graphs conceptually showing a relation between the presence of a sensitivity change and the jitter and the asymmetry. FIG. 21 are waveform diagrams conceptually showing the total jitter and asymmetry of the data pattern recorded by the recording apparatus which does not perform the recording compensation operation and the total jitter and asymmetry of the data pattern recorded by the recording apparatus 1 which has performed the recording compensation operation in the outer PCA 116, in association with the radial position of the optical disc 100.

As shown in FIG. 19, near the outer PCA 116 of the optical disc 100, the recording properties vary widely in comparison with the other area portion. This is considered to be due to the change in recording sensitivity caused by a change in thickness of a recording film.

Now, the recording sensitivity in the area portion on the optical disc is expressed by percentage (%) on the basis of the sensitivity in the middle portion of the optical disc 100 (in other words, near the center of the data recording area 114). Here, FIG. 20(*a*) is a graph showing a change in the jitter and asymmetry when the data pattern is recorded into or near a certain area portion (in other words, the area portion in which the recording compensation operation is performed) after the recording compensation operation is performed in the same area portion. An area portion with a sensitivity change amount of 0% corresponds to the middle portion of the optical disc 100, and an area portion with a sensitivity change amount of −10% substantially corresponds to the outer PCA 116. In other words, the sensitivity change amount on the horizontal axis in FIG. 20(*a*) indicates the change amount of the recording sensitivity in the area portion in which the recording compensation operation is performed (or the recording sensitivity in the area portion in which the data pattern is actually recorded) if the middle portion of the optical disc 100 is used as the base. As shown in FIG. 20(*a*), even if there is a sensitivity change on the recording surface of the optical disc 100, the jitter does not vary widely when the data pattern is recorded into the area portion which is the same as or close to the area portion in which the recording compensation operation is performed. Specifically, even if the recording compensation operation is performed in the area portion with a sensitivity change amount of −10% corresponding to the outer PCA 116, as long as the data pattern is recorded into the outer PCA 116 by using the strategy adjusted there, the jitter is kept approximately 6.5%.

However, when the data pattern is recorded into the area portion which is different from or away from the area portion in which the recording compensation operation is performed, the jitter likely varies widely. FIG. 20(*b*) is a graph showing a change in the jitter and asymmetry when the data pattern is recorded into the middle portion of the optical disc 100 with a sensitivity change amount of 0% after the recording compensation operation is performed in the condition that there is a change in recording sensitivity, after the recording compensation operation is performed in a certain area portion. In other words, the sensitivity change amount on the horizontal axis in FIG. 20(*b*) indicates the change amount of the recording sensitivity in the area portion in which the recording compensation operation is performed if the recording sensitivity in the area portion in which the data pattern is actually recorded is used as the base. As shown in FIG. 20(*b*), if the recording compensation operation is performed in the outer PCA 116 because the recording compensation operation cannot be performed in the inner PCA 111, preferable recording cannot be performed in most area portions of the data recording area 114 whose recording sensitivity is about 10% different from that of the outer PCA 116. Specifically, if the data pattern is recorded into the data recording area 114 corresponding to the area portion with a sensitivity change amount of 0% by using the strategy adjusted in the outer PCA 116 after the recording compensation operation is performed in the outer PCA 116, the jitter deteriorates above approximately 11%.

As described above, the fact that the jitter deteriorates if the data pattern is recorded into the data recording area 114 corresponding to the area portion with a sensitivity change amount of −10% by using the strategy adjusted in the outer PCA 116 after the recording compensation operation is performed in the outer PCA 116 is also clear from the graphs shown in FIG. 21.

In the example, however, if the recording compensation operation cannot be performed in the inner PCA 111, the recording compensation operation is performed in the data recording area 114. Therefore, in comparison with the case where the recording compensation operation is performed in the innermost PCA 111 or the outermost PCA 116, the strategy optimized by the recording compensation operation is highly likely preferable or optimal even in the data recording area 114 in which the data pattern is actually recorded. Thus, even if there is the sensitivity change on the recording surface of the optical disc 100, it is possible to preferably adjust the strategy and to ensure the preferable recording operation.

Incidentally, in the first example, the power for performing the recording compensation operation is calculated in consideration of the aforementioned recording sensitivity. Thus, even if the recording-scheduled area portion and the recording compensation area are located away from each other, it is not considered to be particularly problematic. However, considering the fact that it is more preferable that the properties in the recording-scheduled area portion are closer to the properties in the recording compensation area, the recording-scheduled area portion is preferably closer to the recording compensation area. In this regard, in the first example, it is possible to receive such a great effect that the recording compensation operation can be performed, more preferably.

Moreover, in the aforementioned background art, the special data pattern for OPC is recorded into the area portion of the data recording area 114 in which the data pattern is not scheduled to be recorded. Thus, considering that bringing the area portion in which the special data pattern is recorded close to the area portion in which the data pattern is recorded may cause a runaway operation if a reproducing apparatus mistakenly reads the special data pattern, it is not preferable. On the other hand, according to the first example, in order to perform the recording compensation operation, the normal data pattern is recorded into the area portion of the data recording area 114 in which the data pattern according to the data to be recorded is not scheduled to be recorded. Thus, even if the reproducing apparatus reads the data pattern by bringing the area portion in which the normal data pattern is recorded close to the area portion in which the data pattern according to the data to be recorded is recorded, that does not cause the runway operation. Even in this regard, according to the first example, it is possible to receive excellent effects in comparison with the background art.

(2) Second Example

Next, with reference to FIG. 22, a second example of the recording apparatus of the present invention will be explained. FIG. 22 is a block diagram conceptually showing the basic structure of a recording apparatus 2 in the second example. Incidentally, the same constituents as those of the aforementioned information recording apparatus 1 in the first example will carry the same referential numerals, and the explanation thereof will be omitted.

As shown in FIG. 22, the recording apparatus 2 in the second example is provided with a spindle motor 10, a pickup 11, a HPF 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22, as in the recording apparatus 1 in the first example.

The recording apparatus 2 in the second example is provided particularly with a limit equalizer 15 between the pre-equalizer 14 and each of the delay circuit 18 and the binary circuit 16. The limit equalizer 15 constitutes one specific example of the "amplitude limit filtering device" of the present invention. The limit equalizer 15 performs a high-frequency emphasis process on the read sample value series $RS_C$ without increasing the intersymbol interference, and it outputs a resulting high-frequency emphasized read sample value series $RS_H$ to each of the binary circuit 16 and the delay circuit 18. Incidentally, the operations of the limit equalizer 15 are the same as those of a conventional limit equalizer. Please refer to Japanese Patent publication No. 3459563 for the details.

As a result, the binary circuit 16, the decoding circuit 17, the delay circuit 18, the averaging circuit 19, the pattern judgment circuit 20, the recording strategy adjustment circuit 21, and the CPU 22 located after the limit equalizer 15 use the high-frequency emphasized read sample value series $RS_H$ to perform the operations, instead of the read sample value series $RS_C$.

As described above, according to the second example, the pattern judgment is performed as well as performing the recording compensation operation, by using the output of the limit equalizer 15 (i.e. the high-frequency emphasized read sample value series $RS_H$). In other words, the pattern judgment is performed as well as performing the recording compensation operation, with the amplitude level of the shortest data pattern emphasized. In any states of the asymmetry of the read signal, it is possible to preferably prevent such a state that the shortest data pattern included in the read signal does not cross the zero level. As a result, the shortest data pattern can be preferably detected. This preferably allows the recording compensation operation to be performed with reference to the read signal including the shortest data pattern. In other words, regardless of the state of the asymmetry in the read signal before the recording compensation, the recording compensation operation can be preferably performed.

(3) Third Example

Next, with reference to FIG. 23, a third example of the recording apparatus of the present invention will be explained. FIG. 23 is a block diagram conceptually showing the basic structure of a recording apparatus 3 in the third example. Incidentally, the same constituents as those of the aforementioned recording apparatus 1 in the first example and the recording apparatus 2 in the second example will carry the same referential numerals, and the explanation thereof will be omitted.

As shown in FIG. 23, the recording apparatus 3 in the third example is provided with a spindle motor 10, a pickup 11, a HPF 12, an A/D converter 13, a pre-equalizer 14, a limit equalizer 15, a binary circuit 16, a decoding circuit 17, a delay circuit 18, an averaging circuit 19, a pattern judgment circuit 20, a recording strategy adjustment circuit 21, and a CPU 22, as in the recording apparatus 2 in the second example.

The recording apparatus 3 in the third example is provided particularly with an adder 23 and a reference level detection circuit 24, each of which constitutes one specific example of the "adding device" of the present invention.

The reference level detection circuit 24 outputs a difference between the asymmetry which is actually detected and the asymmetry which is targeted, as offset OFS to the adder 23. On the adder 23, the OFS outputted from the reference level detection circuit 24 is added to the high-frequency emphasized read sample value series $RS_H$ outputted from the limit equalizer 15. This allows the reference level of the high-frequency emphasized read sample value series $RS_H$ to be set to a predetermined value.

Incidentally, a signal detected from the read signal on the reference level detection circuit 24 is not limited to the aforementioned asymmetry but may be a β value. Alternatively, it may be a partial β value indicating the deviation between the amplitude center of the read signal corresponding to the record data with the shortest run length and the amplitude center of the read signal corresponding to the record data with the second shortest run length. Alternatively, it may be an α value indicating a deviation ratio (or rate) of the amplitude center of the read signal corresponding to the record data with the shortest run length, with respect to the amplitude center (i.e. the reference level, and the zero level in the example) of the read signals corresponding to the respective record data with all types of run lengths (e.g. the record data with each of run lengths of 3T to 11T and 14T if the optical disc 100 is a DVD, and the record data with each of run lengths of 2T to 9T if the optical disc 100 is a Blu-ray Disc).

By adopting such a structure, the recording apparatus 3 in the third example can change the reference level, thereby arbitrarily setting the asymmetry of the read signal after the recording compensation. Therefore, it is possible to perform the recording compensation operation which realizes an optimum jitter value and the desired asymmetry. For example, if the optical disc 100 is a DVD, it is possible to perform the recording compensation operation which realizes the minimum jitter value and the asymmetry of +5%. In the same manner, if the optical disc 100 is a Blu-ray Disc, it is possible to perform the recording compensation operation which realizes the minimum jitter value and the asymmetry of +2.5%.

Moreover, since the asymmetry of the read signal after the recording compensation can be set to a desired value without depending on the asymmetry of the read signal before the recording compensation, it is possible to perform the good recording compensation operation even if the asymmetry varies depending on the individual difference of the optical disc 100 and the recording apparatus 3.

Moreover, since such construction that the offset corresponding to the difference between the detected asymmetry and the target asymmetry (i.e. such construction that the desired asymmetry is obtained after the recording compensation by adding the offset to the asymmetry before the recording compensation) is adopted, it is possible to set the asymmetry to the desired value even if the asymmetry before the recording compensation varies due to the recording compensation operation which is performed a plurality of times.

Moreover, since it is unnecessary to adjust the asymmetry by adjusting the recording power (i.e. the amplitude of the recording pulse), it is possible to simplify an operation of adjusting a recording condition, and it is also possible to reduce a time required for the operation of adjusting the recording condition.

Incidentally, in the third example, the recording compensation operation is performed by using the high-frequency emphasized read sample value series $RS_H$ outputted from the limit equalizer 15. However, from the viewpoint that the asymmetry of the read signal after the recording compensation can be set to the desired value, the recording compensation operation is not necessarily performed by using the high-frequency emphasized read sample value series $RS_H$ outputted from the limit equalizer 15. In other words, even if the recording compensation operation is performed by using the read sample value series $RS_C$ outputted from the pre-equalizer 14, obviously, it is possible to receive the effect that the asymmetry of the read signal after the recording compensation can be set to the desired value. Therefore, in the third example, the limit equalizer 15 is not necessarily provided.

Incidentally, the result of the recording compensation operation may be recorded onto the optical disc 100 at each time of the recording operation, as occasion demands. Namely, it may be recorded onto the optical disc 100 when the recording operation is performed by a user, as occasion demands. Alternatively, it may be recorded on the optical disc 100 in advance by using embossed pits, prewriting, or the like, in the manufacturing of the optical disc 100. In this case, it may be recorded in the RMA 112 shown in FIG. 2, a CDZ (Control Data Zone) in the lead-in area 113, or another area portion. In any cases, the aforementioned effects can be preferably received. In this case, information indicating the result of the recording compensation operation is preferably recorded in association with identification information which can identify the recording apparatus 1 (or 2 or 3) which has performed the recording compensation operation.

As described above, by recording the information indicating the result of the recording compensation operation and the identification information which can identify the recording apparatus 1 that has performed the recording compensation operation onto the optical disc 100, it is possible to read the result of the recording compensation operation corresponding to the identification information about the recording apparatus 1, from the optical disc 100, when the data pattern is recorded by the recording apparatus 1. Thus, if the read result of the recording compensation operation is used to set the aforementioned recording condition, it is possible to receive the same various effects as those described above, in the recording operation performed on the optical disc 100 without the recording compensation operation.

Moreover, even if the result of the recording compensation operation corresponding to the identification information about the recording apparatus 1 is not recorded on the optical disc 100, the same effects can be appropriately received by reading a result of the recording compensation operation corresponding to identification information close to the identification information about the recording apparatus 1 (in other words, identification information about another recording apparatus which has a similar property to that of the recording apparatus 1) and by using the read result of the recording compensation operation to set the aforementioned recording condition. Alternatively, the same effects can be also appropriately received by performing the simple recording compensation operation on the basis of the result of the recording compensation operation corresponding to the identification information close to the identification information about the recording apparatus 1.

Moreover, even if the information indicating the result of the recording compensation operation is not recorded on the optical disc 100 for the reason that that the optical disc 100 is blank or the like, the recording compensation operation can be preferably performed by using each of the recording apparatuses in the aforementioned examples. Moreover, if the resulting recording condition is recorded on the optical disc 100 in association with the identification information about the recording apparatus 1, it is possible to receive the same various effects as those described above, in the recording performed on the optical disc 100, without performing the recording compensation operation again.

In other words, without performing the recording compensation operation or with the recording compensation operation performed at least once, it is possible to receive the same various effects as those described above, in the recording performed on the optical disc 100, without performing the recording compensation operation on the corresponding recording apparatus 1. Therefore, it is possible to reduce the number of times that the recording compensation operation is performed, thereby saving an area required for the recording compensation operation.

The present invention is not limited to the aforementioned examples, but various changes may be made, if desired, without departing from the essence or spirit of the invention which can be read from the claims and the entire specification. A recording apparatus and method, a computer program, and a recording medium, all of which involve such changes, are also intended to be within the technical scope of the present invention.

The invention claimed is:

1. A recording apparatus comprising:
a recording device for recording a desired data pattern onto a recording medium comprising an inner area and a user data area located on an outer side of the inner area;
a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device;
a first controlling device for controlling the recording device to record the data pattern with the optimum power into an area portion which is outer than an end on an outer side of the recording-scheduled area portion;
a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device;

a second controlling device for controlling the recording device to record the data pattern for adjusting the recording condition with the adjustment power into the area portion which is outer than the end on the outer side of the recording-scheduled area portion;

a reading device for reading the data pattern recorded by the control of the second controlling device, thereby obtaining a read signal;

a measuring device for measuring jitter of the read signal;

an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

2. The recording apparatus according to claim 1, wherein the second calculating device calculates the adjustment power which allows optimum recording properties of the data pattern recorded by the control of the first controlling device.

3. The recording apparatus according to claim 1, wherein the second calculating device calculates the adjustment power which absorbs the difference between the recording sensitivity in the recording-scheduled area portion and the recording sensitivity in the area portion which is outer than the end on the outer side of the recording-scheduled area portion.

4. The recording apparatus according to claim 1, wherein the first calculating device calculates the optimum power, which is used in recording the data pattern at a first linear velocity into the recording-scheduled area portion, by controlling the recording device to record the data pattern for test writing at a second linear velocity, which is lower than the first linear velocity, in the inner area before the data pattern is recorded at the first linear velocity into the recording-scheduled area portion, the first controlling device controls the recording device to record the data pattern with the optimum power and at the first linear velocity into the area portion which is outer than the end on the outer side of the recording-scheduled area portion, the second calculating device calculates the adjustment power, which is used in adjusting the recording condition of the recording device at the first linear velocity in the area portion which is outer than the end on the outer side of the recording-scheduled area portion, in consideration of the difference between the recording sensitivity in the recording-scheduled area portion and the recording sensitivity in the area portion which is outer than the end on the outer side of the recording-scheduled area portion, by reading the data pattern recorded by the control of the first controlling device, the second controlling device controls the recording device to record the data pattern for adjusting the recording condition with the adjustment power and at the first linear velocity into the area portion which is outer than the end on the outer side of the recording-scheduled area portion, and the third controlling device controls the recording device to start the recording of the data pattern into the recording-scheduled area portion at the first linear velocity by using the optimum power and the recording condition adjusted by the adjusting device.

5. The recording apparatus according to claim 4, wherein the first calculating device calculates the optimum power if the data pattern for adjusting the recording condition at the first linear velocity cannot be recorded into the inner area, the first controlling device controls the recording device to record the data pattern with the optimum power and at the first linear velocity into the area portion which is outer than the end on the outer side of the recording-scheduled area portion if the data pattern for adjusting the recording condition at the first linear velocity cannot be recorded into the inner area, the second calculating device calculates the adjustment power if the data pattern for adjusting the recording condition at the first linear velocity cannot be recorded into the inner area, and the second controlling device controls the recording device to record the data pattern for adjusting the recording condition with the adjustment power and at the first linear velocity into the area portion which is outer than the end on the outer side of the recording-scheduled area portion if the data pattern for adjusting the recording condition at the first linear velocity cannot be recorded into the inner area.

6. The recording apparatus according to claim 1, further comprising:

an amplitude limit filtering device for limiting an amplitude level of the read signal by using a predetermined amplitude limit value, thereby obtaining an amplitude limit signal and for performing a high-frequency emphasis filtering process on the amplitude limit signal, thereby obtaining an equalization-corrected signal; and a detecting device for detecting the data pattern of the equalization-corrected signal, the measuring device measuring jitter of the equalization-corrected signal, the adjusting device adjusting the recording condition such that the jitter measured by the measuring device satisfies a desired condition, with reference to the data pattern detected by the detecting device.

7. The recording apparatus according to claim 6, further comprising an adding device for adding a predetermined offset signal to the read signal, thereby obtaining an offset-added signal, the measuring device measuring the jitter of the offset-added signal.

8. The recording apparatus according to claim 1, wherein the measuring device measures, as the jitter, a shift jitter component caused by a state of the recorded data pattern from among the jitter, and the adjusting device adjusts the recording condition such that the shift jitter component as the jitter satisfies the desired condition.

9. The recording apparatus according to claim 8, wherein a state in which the jitter satisfies the desired condition is a state in which the shift jitter component is less than or equal to a first predetermined value.

10. The information recording apparatus according to claim 8, wherein a state in which the jitter satisfies the desired condition is a state in which the shift jitter components in a plurality of types of respective data patterns with different run lengths are substantially the same to each other.

11. A recording method in a recording apparatus comprising: a recording device for recording a desired data pattern onto a recording medium comprising an inner area and a user data area located on an outer side of the inner area, the recording method comprising:
 a first calculating process of calculating an optimum power, which is used in recording the data pattern into a recording-scheduled area portion, before the data pattern is recorded into the recording-scheduled area portion which is an area portion in the user data area in which the data pattern is scheduled to be recorded by the recording device;
 a first controlling process of controlling the recording device to record the data pattern with the optimum power into an area portion which is outer than an end on an outer side of the recording-scheduled area portion;
 a second calculating process of calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling process;
 a second controlling process of controlling the recording device to record the data pattern for adjusting the recording condition with the adjustment power into the area portion which is outer than the end on the outer side of the recording-scheduled area portion;
 a reading process of reading the data pattern recorded by the control of the second controlling process, thereby obtaining a read signal;
 a measuring process of measuring jitter of the read signal;
 an adjusting process of adjusting the recording condition such that the jitter measured by the measuring process satisfies a desired condition; and
 a third controlling process of controlling the recording device to start the recording of the data pattern into the recording-scheduled area portion by using the optimum power and the recording condition adjusted by the adjusting process.

12. A computer readable recording medium recording thereon a computer program for recording control and for controlling a computer provided in a recording apparatus comprising: a recording device for recording a desired data pattern onto a recording medium comprising an inner area and a user data area located on an outer side of the inner area; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device,
 the computer program making the computer function as at least one portion of the recording device, the first calculating device, the first controlling device, the second calculating device, the second controlling device, the reading device, the measuring device, the adjusting device, and the third controlling device.

13. A recording medium which comprises an inner area and a user data area located on an outer side of the inner area and on which a data pattern is recorded by a recording apparatus comprising: a recording device for recording the desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting a recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

14. A recording medium comprising: an inner area; a user data area located on an outer side of the inner area; and a recording condition recording area to record therein a recording condition adjusted by a recording apparatus comprising: a recording device for recording a desired data pattern onto the recording medium; a first calculating device for calculating an optimum power, which is used in recording the data pattern into a recording-scheduled area portion, before the data pattern is recorded into the recording-scheduled area portion which is an area portion in the user data area in which the data pattern is scheduled to be recorded by the recording device; a first controlling device for controlling the recording device to record the data pattern with the optimum power into an area portion which is outer than an end on an outer side of the recording-scheduled area portion; a second calculating device for calculating an adjustment power, which is used in adjusting the recording condition of the recording device in an area portion which is outer than the end on the outer side of the recording-scheduled area portion, in consideration of a difference between a recording sensitivity in the recording-scheduled area portion and a recording sensitivity in the area portion which is outer than the end on the outer side of the recording-scheduled area portion, by reading the data pattern recorded by the control of the first controlling device; a second controlling device for controlling the recording device to record the data pattern for adjusting the recording condition with the adjustment power into the area portion which is outer than the end on the outer side of the recording-scheduled area portion; a reading device for reading the data pattern recorded by the control of the second controlling device, thereby obtaining a read signal; a measuring device for measuring jitter of the read signal; an adjusting device for adjusting the recording condition such that the jitter measured by the measuring device satisfies a desired condition; and a third controlling device for controlling the recording device to start the recording of the data pattern into the recording-scheduled area portion by using the optimum power and the recording condition adjusted by the adjusting device.

* * * * *